(12) United States Patent
Morita et al.

(10) Patent No.: US 6,769,987 B1
(45) Date of Patent: Aug. 3, 2004

(54) GAME APPARATUS, GAME DISPLAYING METHOD, GAME SCORE EVALUATING METHOD, AND RECORDING MEDIA RECORDED WITH GAME PROGRAM

(75) Inventors: Masamoto Morita, Tokyo (JP); Akimitsu Hanato, Matsudo (JP)

(73) Assignee: Sega Enterprises, Ltd., Tokyo (JP)

( * ) Notice: Subject to any disclaimer, the term of this patent is extended or adjusted under 35 U.S.C. 154(b) by 0 days.

(21) Appl. No.: 09/101,928

(22) PCT Filed: Nov. 21, 1997

(86) PCT No.: PCT/JP97/04261

§ 371 (c)(1),
(2), (4) Date: Jan. 13, 1998

(87) PCT Pub. No.: WO98/22191

PCT Pub. Date: May 28, 1998

(30) Foreign Application Priority Data

Nov. 22, 1996 (JP) .............................. 8/312300

(51) Int. Cl.[7] .............................................. A63F 13/00
(52) U.S. Cl. ........................................... 463/31; 463/1
(58) Field of Search .............................. 463/30, 31, 32, 463/33, 34, 43, 44, 45, 1, 36, 6; 434/38, 69, 29; 345/1, 4, 418, 302, 433, 112, 133, 327, 501, 507, 204, 949

(56) References Cited

U.S. PATENT DOCUMENTS

| | | | | |
|---|---|---|---|---|
| 4,342,454 A | * | 8/1982 | Baer et al. .................... 345/672 |
| 4,572,509 A | * | 2/1986 | Sitrick ........................ 463/31 |
| 5,269,687 A | * | 12/1993 | Mott et al. ................... 273/454 |
| 5,395,242 A | * | 3/1995 | Slye et al. ................... 273/237 |
| 5,507,485 A | * | 4/1996 | Fisher ........................ 473/131 |
| 5,558,339 A | * | 9/1996 | Perlman ....................... 463/23 |
| 5,779,548 A | * | 7/1998 | Asai et al. ................... 463/1 |
| 6,010,403 A | * | 1/2000 | Adam et al. ................... 463/6 |

FOREIGN PATENT DOCUMENTS

| | | | |
|---|---|---|---|
| EP | 0 715 869 | 11/1996 | ............. A63F/9/22 |
| EP | 830880 A2 | * 3/1998 | ............. A63F/9/22 |
| JP | 4-54986 | 2/1992 | |
| JP | Hei 6-20180 | 1/1994 | |
| JP | 6-343759 | 12/1994 | |
| JP | 7-204353 | 8/1995 | |
| WO | WO 96/00601 | 11/1996 | |

OTHER PUBLICATIONS

Sega Saturn Conquering Series 3: How to Master Sega International Victory Goal, Futabash Publishers Ltd., pp. 29 and 50, Jan. 15, 1996.

* cited by examiner

*Primary Examiner*—Teresa Walberg
*Assistant Examiner*—Scott E. Jones
(74) *Attorney, Agent, or Firm*—Venable LLP; Andrew C. Aitken

(57) ABSTRACT

A game system and method is disclosed that has at least one game display, an input controller, and a device executing a game program, wherein a controller for displaying the progress of a game as a real time image on the game display, in response to information input through the input controller is provided. The invention includes data storage for replaying a predetermined scene of the real time image and a replay controller for displaying the replay sequence in response in response to predetermined criteria. The replay is displayed on a replay display window that appears on the game display and replay display is shown along with a part of or the entire said real time image. Furthermore, the replay display and the real time image are simultaneously displayed.

18 Claims, 19 Drawing Sheets

Grading Report

AS A RESULT OF EXAMINATION, YOU ARE AWARDED

2nd GRADE

FOR YOUR SKILL IN PLAYING GAME.

Let's find out where a block set should fall to delete blocks as much as possible.

GAME APPARATUS, GAME DISPLAYING METHOD, GAME SCORE EVALUATING METHOD, AND RECORDING MEDIA RECORDED WITH GAME PROGRAM

FIELD OF THE INVENTION

The present invention relates to a game device for home or business use, more particularly to game apparatus, game displaying method, game score evaluating method and a recording media recorded with a game program thereby making it possible to more attract operator's (hereinafter may be referred to as "player") interest in a game.

BACKGROUND OF THE INVENTION

There have so far been proposed a wide variety of game devices for home use for men and women regardless of their age to amuse themselves by playing with. The game devices for business use, the other type of typical games, have been played by a lot of game lovers who are willing to check their skill level of playing the game or seeking recent trends in games.

The game devices of this type each generally comprises input means including a button and a joystick for inputting data based on the manipulation by an operator, a storage media, such as a ROM, in which a game program is stored, displaying means such as a CRT for displaying an image, sound output means for outputting sound and control means for controlling the device by way of executing the game program, forming an image and sound on the basis of the data inputted via the input means and controlling the displaying means to display the image and the sound output means to output the sound. The game program serves as a central role for the game device constructed as above described. There have been developed and provided a wide variety of game programs (hereinlater simply referred to as games as well) in order to meet the requirements of a wide variety of players including beginners to high skilled players of any age group.

The most interesting thing for the players is the final game result, i.e., the records shown as scores or the like. Excitement and a refreshing feelings during the game play are also attractive for the players. Drastic changes of the situation in the game during the play give the excitement and the refreshing feelings to the players. An example of showing the drastic change of the situation in a game so-called "a puzzle game" is described hereinlater.

There has been introduced a puzzle game of displaying an object at an upper. part of set area in a display image wherein the object successively appears at a predetermined intervals and each falls down to a lower part, making a player move the object right and left and rotate to be arranged at a bottom part of the set area. In this puzzle game, the objects arranged at the bottom of the set area are programmed to be deleted at once in a predetermined situation, for example, when two objects in a same form are arranged at the bottom of the set area adjacent to each other, both of the objects are deleted at once. The players compete for the numbers of the deleted objects. This kind of games are simple in rule and easy to operate, therefore being popular among wide range of generation for a long time, despite these are not remarkably outstanding. There has been proposed a same kind of game having two windows in a display image at a same time and enabling two players to compete against each other. In this competing type puzzle game, the players are able to display obstacles at the window of the competitor, wherein the obstacles are not deleted in the usual predetermined situation, so that the players can enjoy fighting feelings.

Players can feel the drastic change in this kind of puzzle game when a big block including many of the objects is deleted. In some of this kind of games, the block is not simply deleted, but deleted with a big sound as if many balloons split at once. Therefore the players can get refreshing feelings and excitement visually and auditory. Furthermore, this kind of drastic change in the game can cause excitement among the bystanders watching the game play.

However, the players playing the conventional above described games can recognize the drastic change in the game in an ongoing image only once at real time. In this game, the players cannot see the drastic change in the game again to recall the excitement. Furthermore, the bystanders who cannot grasp the situation of the game nor the operation of the game cannot enjoy the excitement occurring from the drastic change in the game. The players, sometimes, themselves get more excited by feeling the excitement occurred among the bystanders who are watching the game play. This kind of multiplier effect cannot be expected if the bystanders are not excited enough. Conventionally, there has been provided as well a kind of games which comprises a storage media and can store certain images of the game during the play into the storage media. In this type of the game, the stored images are shown on the screen as replay images for a while by interrupting the game during the play. This kind of games encounter a drawback described hereinlater. In order to display the replay images, the game play is interrupted and the players who does not want to see the replay image cannot enjoy the game by the interruption.

In conventional games, the results are thought to be important and the records of the game is calculated according to the result of the inputted data based on the manipulation by the players. There are few operations for the player to operate in order to get high scores and it is easy for the high-skilled players to get high scores, therefore they are not satisfied with playing the game.

Furthermore, in conventional compete type games, a player can insert an obstacle, which can inhibit the movement of the objects being controlled by a competitor, to the competitor's window. For example, in case of the puzzle game, the player can insert the obstacle, which cannot be deleted in the usual predetermined situation in which the usual objects are deleted, to disturb the game play of the competitor. Therefore, the competitor who is disturbed by the player cannot feel continuity of the game play before and after the disturbance and cannot enjoy the most of characteristic of the game.

Therefore the object of this invention is to provide a game device, method of displaying images of games, method of analyzing the results of games and a storage media, in which a game program is stored, for giving refreshment feelings and excitement to both players of the game and bystanders watching the game, giving a lot of alternatives in operation of the game to get high-scores and making the most of characteristic of the game.

SUMMARY OF THE INVENTION

It is a first object of the present invention to provide a game apparatus comprising:
  image producing means for producing an image; and
  drawing control means for drawing the image produced by said image producing means as a real-time image on a predetermined storage area for temporarily storing the image which is prepared to be displayed but still has not been displayed, in which said game apparatus further comprising:

storing means for storing information on the image drawn on said storage area; and deciding means for deciding, according to the information on the image stored in said storage area, whether an image should be reproduced or not;

said drawing control means drawing the image decided to be reproduced by said deciding means as a reproduced image while drawing said real-time image on said storage area.

It is a further object of the present invention to provide a game apparatus comprising:

display means for displaying an image;

image processing means for processing the image to be displayed on said display means in response to an instruction given by an operator;

storing means for storing information on said image for a reproduced image to be displayed on said display means;

judging means for judging whether there is caused a situation satisfying a predetermined condition or not; and reproducing means for displaying not only said image but also the image reproduced on the basis of the information stored in said storing means when said judging means judges that there is caused a situation satisfying said predetermined condition.

Furthermore, said drawing control means may open a window on the real-time image drawn on said storage area so as to draw the reproduced image on said window.

Moreover, the game apparatus may comprise two display units each having a display screen capable of displaying the image drawn on said storage area, said one of said two display units displaying said real-time image on its display screen, and the other of said two display units displaying said reproduced image on its display screen.

Furthermore, said drawing control means may allow said storage area to be drawn not only the reproduced image but also appended information relevant to said reproduced image therein.

Moreover, said deciding means may decide to reproduce the image corresponding to the real-time image representing a game situation when a variation of the game situation represented by said image exceeds a predetermined level.

Moreover, said deciding means may decide which of the images is reproduced in response to an instruction given by said operator.

Moreover, the game apparatus may further comprise sound means for producing or storing a sound to be outputted and synchronized with said reproduced image drawn on said storage area.

It is a second object of the present invention to provide a game apparatus being capable of making an operator play a game together with a competitor, comprising:

image producing means for producing an image;

drawing control means for drawing the image produced by said image producing means on a predetermined storage area for temporarily storing the image which is prepared to be displayed but still has not been displayed; and deciding means for deciding whether a faculty of said competitor should be impaired or not;

said drawing producing means producing an image which makes the competitor's understanding weak and said drawing control means drawing said image on said storage area when said deciding means decides that said faculty of said competitor should be impaired.

Moreover, said image producing means may produce an image utilized for masking part of the image to be recognized by said competitor.

Moreover, said image producing means may produce an image including a background to be recognized by said competitor, and said background having a color changed from the original color of the background of said image.

Moreover, said image producing means may produce an image including a background to be recognized by said competitor, and said background having patterns changed from the original patterns of the background of said image.

Moreover, said image producing means may produce an image including a background to be recognized by said competitor, and said background having a brightness changed from the original brightness of the background of said image.

Moreover, the game apparatus may further comprise record means for recording the image produced by said image producing means in response to an instruction given by said operator, said drawing control means draws, on said storage area, an image stored in said recording means as a background to be recognized by said competitor.

Moreover, said image producing means may produce an image including an object to be controlled by said competitor, said object being transformed from the original object in said image.

Moreover, said image producing means may produce an image including an object to be controlled by said competitor, said object having a color changed from the original color of the object in said image.

Moreover, said drawing control means may draw objects on a window opened on said storage area, said objects being possible to arranged in a matrix having a plurality of rows and a plurality of columns, and deletes a plurality of objects which satisfy a predetermined condition, when said objects arranged by an instruction given by said operator are adjacent to each other.

It is a third object of the present invention to provide a game apparatus comprising:

estimating means for estimating an instruction procedure formed with a series of instructions appropriate to situations in a virtual space;

input means for allowing said operator to input an instruction;

comparing means for comparing an instruction procedure formed with instructions which are actually inputted to said input means by said operator with the instruction procedure estimated by said estimating means; and evaluating means for evaluating said operator's control on the basis of the result compared by said comparing means.

Moreover, a game apparatus may comprise:

estimating means for estimating a movement of an object under a predetermined condition in a virtual space;

control means for controlling said object in accordance with an operator's control;

comparing means for comparing information obtained by said control means with information obtained by said estimating means; and evaluating means for evaluating said operator's control on the basis of information on the result compared by said comparing means.

Moreover, said estimating means may estimate an instruction procedure adaptable for making the evaluation of the instructions themselves which are inputted to said input means by said operator during the game regardless of a variation of a game situation incidentally caused by said instructions given by the operator.

Moreover, said estimating means may estimate an instruction procedure adaptable for making the evaluation of the instructions themselves which are inputted to said input means by said operator during the game when a game situation is invariable except the variation directly caused by the instructions given by the operator.

Moreover, said estimating means may estimate an instruction procedure adaptable for making the evaluation of a first instruction itself which is inputted to said input means by said operator during the game before a second instruction is inputted by said operator when the variation in a game situation is larger than a minimum variation in the game situation which can be caused by said first instruction.

Moreover, said evaluating means may have a plurality of predetermined classes representing a skillful grade of the operators to classify the skillful grade of the operator into one of said classes and represents the result of the evaluation as said classified class.

Moreover, said evaluating means may have a plurality of predetermined evaluating parameters and represents values of the evaluating parameters as a radar chart having a plurality of elements, said plurality of elements of said radar chart corresponding to the evaluating parameters.

It is a fourth object of the present invention to provide a game method comprising the steps of:
  producing an image;
  firstly drawing the image produced in said image producing step as a real-time image on a predetermined storage area for temporarily storing the image which is prepared to be displayed but still has not been displayed;
  storing information on the image drawn on said storage area;
  deciding, according to the information on the image stored in said storage area, whether an image should be reproduced or not;
  secondly drawing the image decided to be reproduced in said deciding step as a reproduced image while drawing said real-time image on said storage area.

Moreover, a game method may further comprise the step of outputting a sound relevant to said reproduced image while displaying said reproduced image.

It is a fifth object of the present invention to provide a game method capable of making an operator play a game together with a competitor, comprising the steps of:
  deciding whether a faculty of said competitor should be impaired or not;
  drawing an image which makes the competitor's understanding weak on a predetermined storage area for temporarily storing the image, which is prepared to be displayed but still has not been displayed when the decision is made in said deciding step that said faculty of said competitor is impaired.

It is a sixth object of the present invention to provide a game method comprising the steps of:
  allowing an operator to input an instruction;
  storing a predetermined instruction procedure formed with a series of instructions; and
  making an evaluation on the basis of the similarity between the instruction procedure formed with a series of instructions actually inputted to said input means by said operator and said instruction procedure stored in said storing means.

Moreover, the instruction procedure stored in said storing step may be adaptable for making the evaluation of the instructions themselves which are inputted by said operator in said inputting step during the game regardless of a variation of a game situation incidentally caused by said instructions.

Moreover, the instruction procedure stored in said storing step may be adaptable for making the evaluation of said instructions themselves which are inputted by said operator in said inputting step during the game when a game situation is invariable except the variation directly caused by the instructions given by the operator.

Moreover, the instruction procedure stored in said storing step may be adaptable for making the evaluation of a first instruction itself which is inputted to said input means by said operator during the game before a second instruction is inputted by said operator when the variation in a game situation is larger than a minimum variation in the game situation which can be caused by said first instruction.

It is a seventh object of the present invention to provide a recording media recorded with a game program for controlling a game apparatus comprising a computer, in which said program is executed by said computer to perform a method comprising the steps of:
  producing an image;
  firstly drawing the image produced in said image producing step as a real-time image on a predetermined storage area for temporarily storing the image which is prepared to be displayed but still has not been displayed;
  storing information on the image drawn on said storage area;
  deciding, according to the information on the image stored in said storage area, whether an image should be reproduced or not;
  secondly drawing the image decided to be reproduced in said deciding step as a reproduced image while drawing said real-time image on said storage area.

Moreover, said reproduced image may be produced in addition to information relevant to said reproduced image in said second drawing step when said reproduced image is produced onto said storage area.

Moreover, said program may further comprise the step of outputting a sound relevant to said reproduced image while displaying said reproduced image in said second reproducing step.

It is an eighth object of the present invention to provide a recording media recorded with a game program for controlling a game apparatus comprising a computer and being capable of making an operator play play a game together with a competitor, in which said program is executed by said computer to perform a method comprising the steps of:
  deciding whether a faculty of said competitor should be impaired or not; and
  drawing an image which makes the competitor's understanding weak on a predetermined storage area for temporarily storing the image, which is prepared to be displayed but still has not been displayed, while said image producing means produces an image when the decision is made in said deciding step that said faculty of said competitor is impaired.

It is a ninth object of the present invention to provide a recording media recorded with a game program for controlling a game apparatus comprising a computer, in which said program is executed by said computer to perform a method comprising the steps of:

allowing an operator to input an instruction;

storing a predetermined instruction procedure formed with a series of instructions; and making an evaluation on the basis of the similarity between the instruction procedure formed with a series of instructions actually inputted to said input means by said operator and said instruction procedure stored in said storing means.

Moreover, the instruction procedure stored in said storing step may be adaptable for making the evaluation of the instructions themselves which are inputted by said operator in said inputting step during the game regardless of a variation of a game situation incidentally caused by said instructions.

Moreover, the instruction procedure stored in said storing step may be adaptable for making the evaluation of said instructions themselves which are inputted by said operator in said inputting step during the game when a game situation is invariable except the variation directly caused by the instructions given by the operator.

Moreover, the instruction procedure stored in said storing step may be adaptable for making the evaluation of a first instruction itself which is inputted to said input means by said operator during the game before a second instruction is inputted by said operator when the variation in a game situation is larger than a minimum variation in the game situation which can be caused by said first instruction.

It is a tenth object of the present invention to provide a game apparatus operable to draw objects, which can be arranged at a matrix formed by a plurality of rows and a plurality of columns, on a predetermined storing area, and to delete a plurality of said objects which are arranged in series lengthways or slantwise and adjacent to each other by an instruction given by an operator so as to satisfy a predetermined condition, in which the number of columns on which the objects can be arranged in said storing area is more than seven. Alternatively, it is an object of the present invention to provide a game apparatus operable to draw objects, which can be arranged at a matrix formed by a plurality of rows and a plurality of columns, on a predetermined storing area, and to delete a plurality of said objects having the same color which are arranged in series and adjacent to each other by an instruction given by an operator, in which the number of columns on which the objects can be arranged in said storing area is more than seven. Moreover, the number of columns on which the objects can be arranged in said storing area may be an odd number.

BRIEF DESCRIPTION OF THE DRAWINGS

The present invention and many of the advantages thereof will be better understood from the following detailed description when considered in connection with the accompanying drawings, wherein.

DESCRIPTION OF THE PREFERRED EMBODIMENTS

Figure 1:
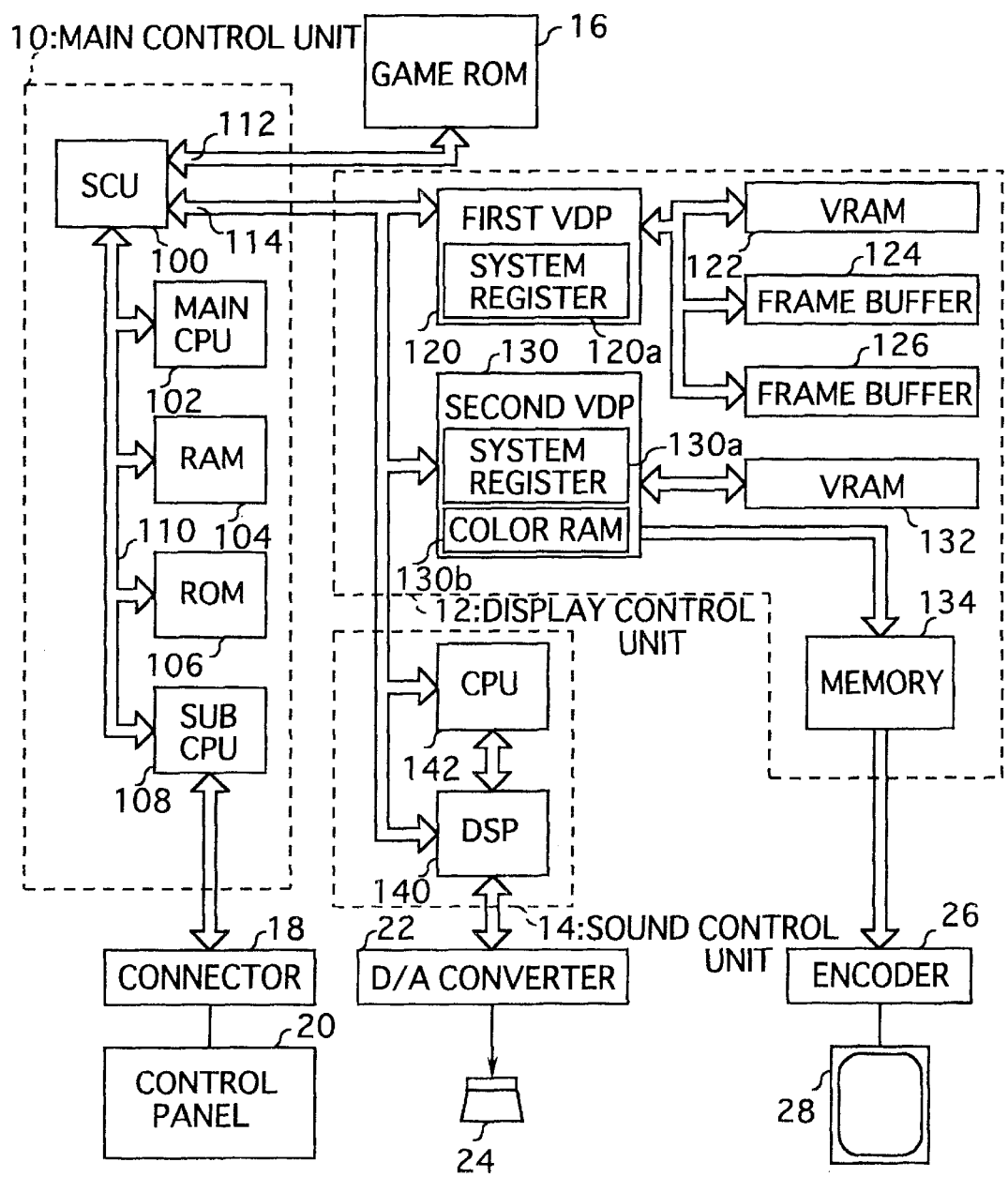
FIG. 1 is a block diagram showing a preferred embodiment of a game apparatus according to the present invention.

Referring now to the drawings, a preferred embodiment of the game apparatus according to the present invention will be explained hereinafter. FIG. 1 is a block diagram showing the present embodiment of the game apparatus.

As shown in FIG. 1, the game apparatus comprises a main control unit 10 for controlling the whole game apparatus, a display control unit 12 for controlling game screen to be displayed and a sound control unit 14 for producing a sound.

The main control unit 10 comprises an SCU (System Control Unit) 100, a main CPU 102, RAM 104, ROM 106 and a sub CPU 108, all of which are connected with each other through a bus 110.

The SCU 100 is connected to a game ROM 16, in which a game program is stored, through a bus 112 and also connected to the display control unit 12 and the sound control unit 14 through a bus 114. The SCU 100 is designed to control the main CPU 102, VDPs (Video Display Processors) 120 and 130, a DSP (Digital Signal Processor) 140 and a CPU 142 to input and output data from and to each other by way of the buses 110, 112 and 114.

The main CPU 102 has a computing function similar to that of the DSP and is designed to execute the game program stored in the game ROM 16 at high speed.

The RAM 104 serves as a work area for the main CPU 102 and temporarily keeps the game program or data indicative of a object (including an object (a block as will be described later) described in this specification).

The ROM 106 has various programs, such as an initial program for performing the initialization, and data common to a large variety of games, stored therein.

The sub CPU 108 is connected to a control panel 20 through a connector 18. The control panel 20 is provided with a joystick or various buttons (not shown) handled by the player. The sub CPU 108 is referred to as "SMPC (System Manager & Peripheral Control)" and capable of accepting instruction data from the control panel and passing the instruction data to the main CPU 102 in response to the request from the main CPU 102.

The main CPU 102 is operated to process an image in response to the instruction data received from the sub CPU 108. For instance, the main CPU 102 is operated to process the image which is displayed on the game screen and represents an object to be rotationally shifted or moved. The manner of processing the image will be described in detail latter.

The display control unit 12 is provided with a first VDP 120 for drawing an image for an object or a background and a second VDP 130 for drawing a scroll image or a scroll background. The second VDP 130 is further designed to decide the order to display the images in accordance with a priority, synthesize data on the image and data on the scroll image to form an synthetic image, and clip the image. The display control unit 12 is also provided with a VRAM 122, frame buffers 124 and 126, a VRAM 132 and a memory 134. The VRAM 122 and the frame buffers 124 and 126 are connected to the first VDP 120, while the VRAM 132 and the memory 134 are connected to the second VDP 130. The first VDP 120 and the second VDP 130 are connected to each other through the bus 114.

The first VDP 120 has a system register 120a built-in. The drawing data indicative of the object are transferred to the first VDP 120 by way of the main CPU 102 and written onto the VRAM 122. The drawing data written onto the VRAM 122 are then drawn into the frame buffers 124 or 126 for drawing the image. The frame data drawn into the frame buffers 124 or 126 are transferred to the second VDP 130 when the frame data are displayed on the screen. The frame buffers 124 and 126 are alternately used for between drawing the image and displaying the image on the screen for every frame.

On the other hand, there are provided information concerning the control of image drawing is transferred from the main CPU 102 to the system register 120a of the first VDP 120 through the SCU 100 and then drawn in the system register 120a of the first VDP 120. The first VDP 120 is operated to control the image drawing and the image display according to these information registered in the system register 120a.

The second VDP 130 has a register 130a and a color RAM 130b built-in. The image data are registered in the VRAM 132 and the color RAM 130b by the main CPU 102 by way of the SCU 100. The information concerning the control of image display are also registered in the register 130a by the main CPU 102 via the SCU 100. The data registered in the VRAM 132 are read out in accordance with the control information registered in the register 130a of the second VDP 130 to obtain an image data for representing the background, which is contrasted with the object, to be displayed on the scroll screen. The image data on each scroll screen and the image data transferred from the first VDP 120 are synthesized into data on the final display image according to the priority. The priority is decided in accordance with the control information registered into the register 130a. The second VDP 130 is operated to read out color data which are defined base on the display image data and registered into the color RAM 130b. The color data thus read out form into a display color data. The display color data are stored into the memory 134.

The display color data thus stored into the memory 134 are outputted to an encoder 26. The encoder 26 is designed to produce a video signal with an additional signal, such as a synchronization signal, and output the video signal to a monitor 28. The monitor 28 displays the game screen thereon.

The sound control unit 14 is provided with a DSP 140 for synthesizing the sounds through the manner of a PCM system or a FM system and a CPU 142 for controlling the DSP 140. The sound data synthesized by the DSP 140 are converted into a sound signal by a D/A converter 22 to be outputted from a speaker 24.

It will be explained hereinafter in detail how this embodiment of the game apparatus performs a puzzle game.

Figure 2A:
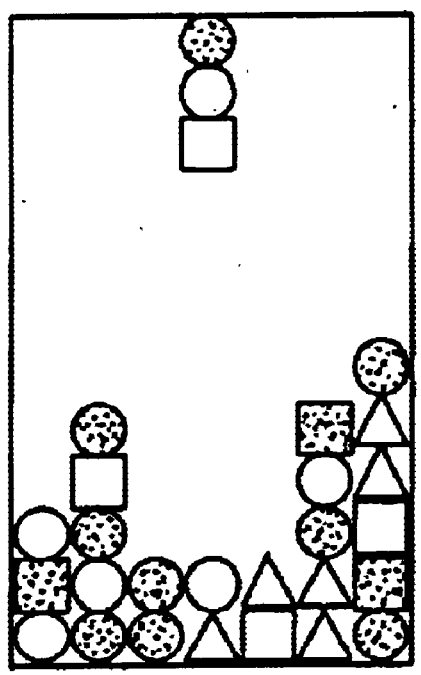
FIGS. 2(*a*)–(*c*) is a diagram showing the details of the game apparatus shown in FIG. 1.
Figure 2B:
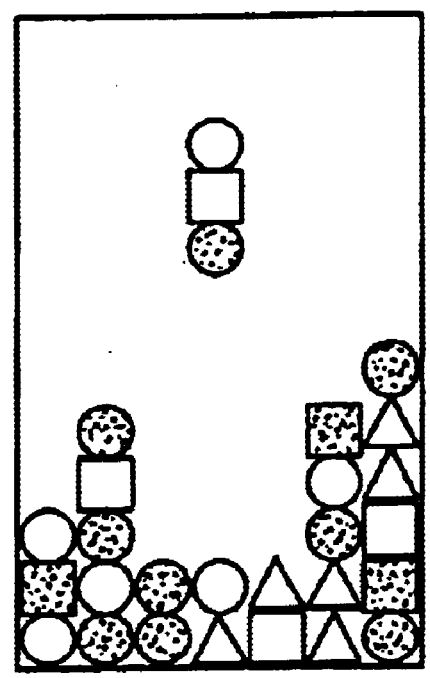
Figure 2C:
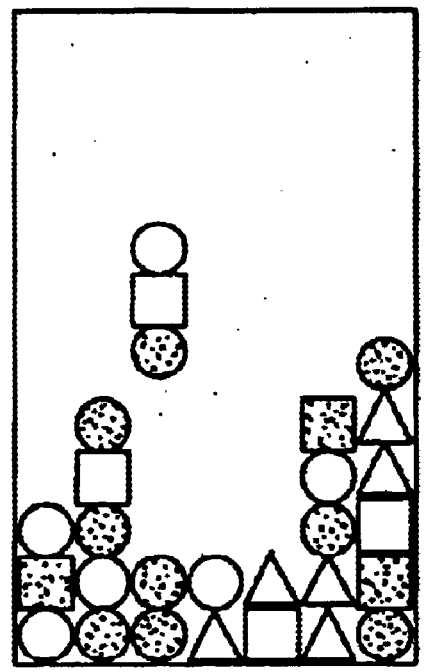
Figure 3A:
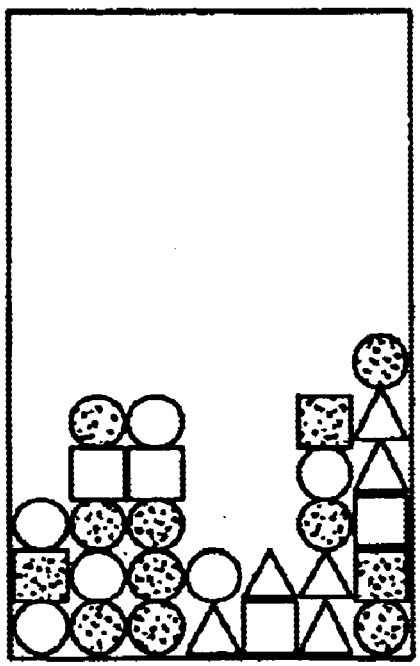
FIGS. 3(*a*)–(*c*) is a diagram showing the details of the game apparatus shown in FIG. 1 which follows the details shown in FIG. 2.

As shown in FIG. 2(a), there is prepared a window capable of displaying a plurality of blocks, which are arranged in a matrix including 7 columns and 12 rows, in the game. Furthermore, there is prepared a set of three blocks arranged lengthways to be displayed in the window. The set of three blocks falls from the top of the window in sequence. In this embodiment, each of the elements displayed on the window is referred to as "a block", while the set of three blocks, which falls from the top of the window, is referred to as "a block set" hereinafter. The blocks may be sorted into several kinds of groups. Each of the three blocks in a block set may be respective rotationally shifted in the arrangement of the block set in response to the instruction given by the player as shown in FIG. 2(b). The block set may be moved sideways in response to the instruction given by the player as shown in FIG. 2(c) while falling the block set. Finally, the blocks may be moved toward a desired position as shown in FIG. 3(a).

Figure 3B:
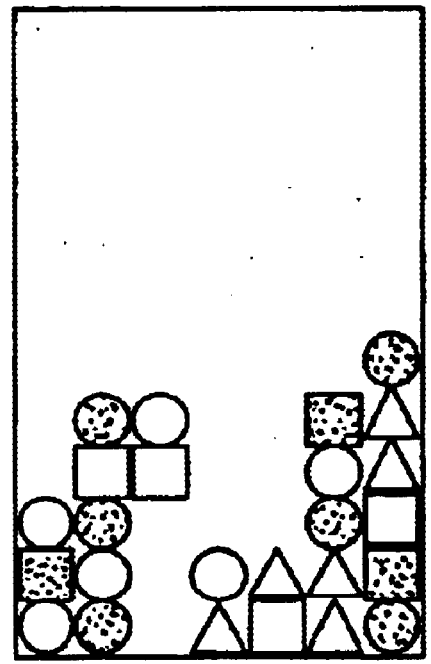
Figure 3C:
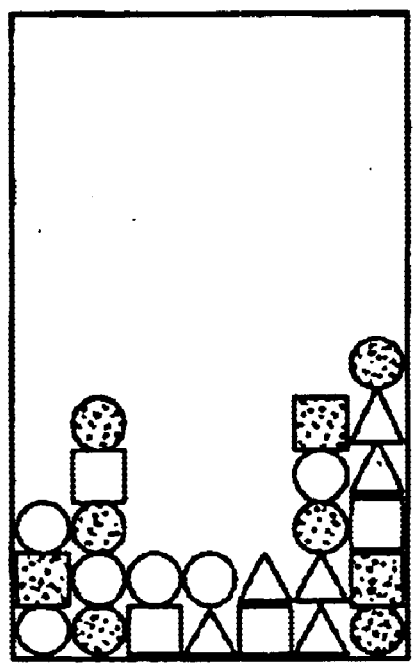
Figure 4A:
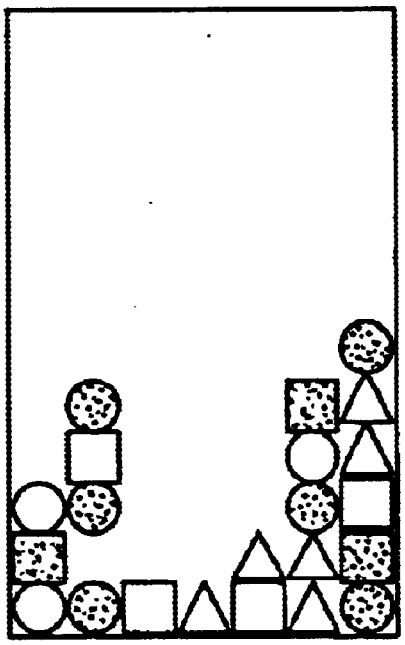
FIGS. 4(*a*)–(*c*) is a diagram showing the details of the game apparatus shown in FIG. 1 which follows the details shown in FIG. 3.
Figure 4B:
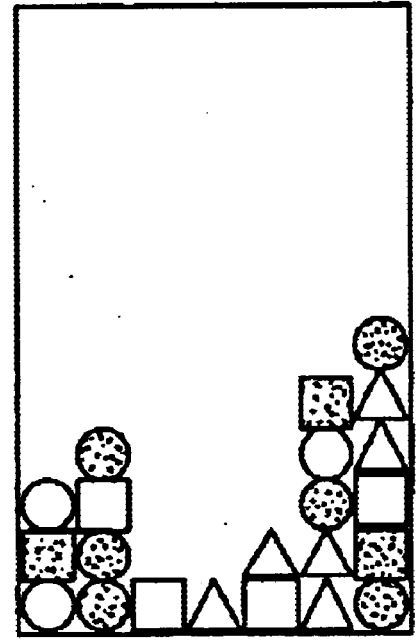

In this case, the block set, if desired, may be dropped rapidly by the player. When more than three of blocks, which are the same kinds of blocks, are arranged lengthways, sideways or slantwise, these blocks thus arranged are deleted from the window as shown in FIG. 3(b). When the blocks are deleted to form into a blank area in the window, the blocks positioned at the upper location than the location of the blank area come down as shown in FIG. 3(c). When the blocks are newly arranged resulting from deleting and then falling the blocks, there are caused a series of more than three blocks which are linked together. As shown in FIG. 4(a), the linked blocks are also deleted to form into a blank area. Furthermore, the blocks positioned at upper location than the location of the blank area are dropped into the blank area as shown in FIG. 4(b).

Figure 4C:
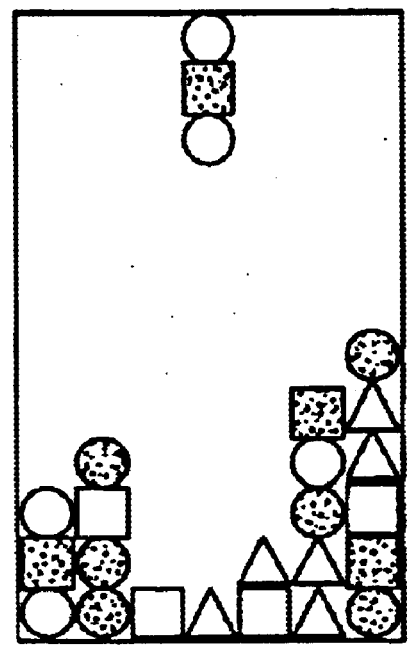

The aforementioned processes of reconstructing the arrangement of the blocks and deleting the blocks are repeated until there is no block linked to form into a series of more than three blocks. In this embodiment, the process of deleting the blocks caused one time is referred to as "a link" in the following description. When the process of deleting the blocks is repeated twice, these repeated operations are referred to as "two links". When the process of deleting the blocks is repeated three times, these repeated operations are referred to as "three links". When there is not link at all or when the links are terminated, the next block set is displayed and then falls as shown in FIG. 4(c). Moreover, there is another kind of block which is referred to as a "special block" in this embodiment. This special block has an especial function in which the special block falls and is touch on the block in the window, thereby making it possible to delete any blocks each having the same kinds as that of the block touched by the special block. The number of columns, on which the blocks are possible to be arranged and displayed in the above described window, may be preferably more than 7, more preferably an odd number. When the number of the columns are the odd number, the block set preferably starts to fall from the top at a center of the window.

Figure 5:
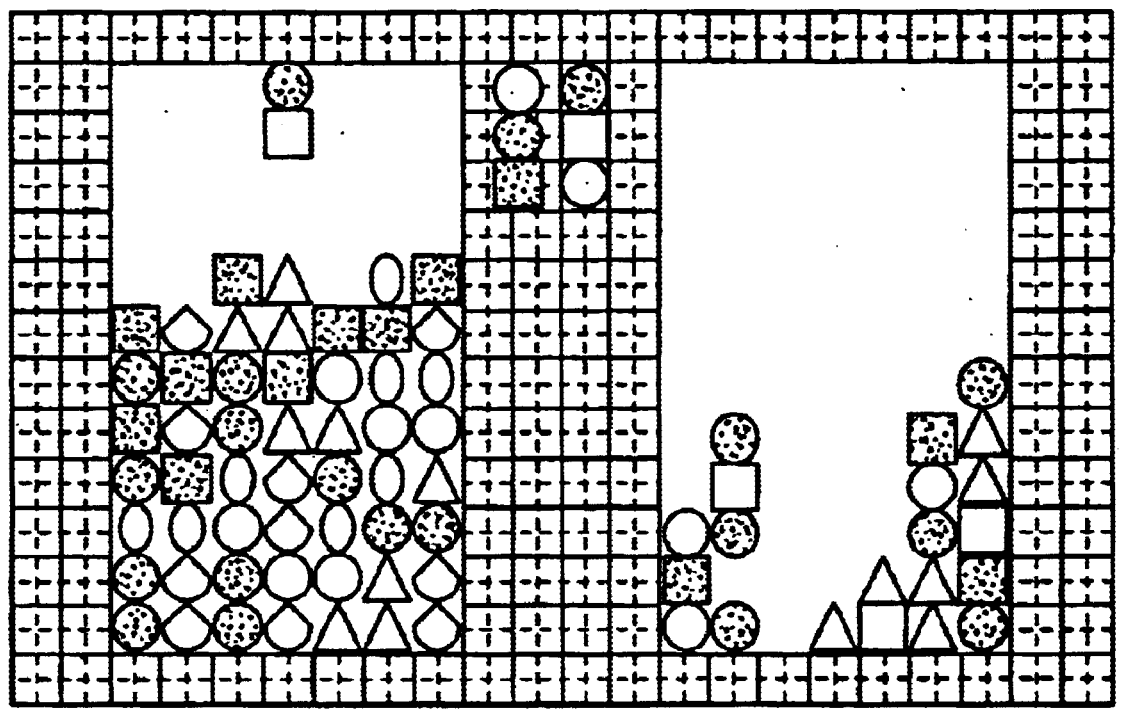
FIG. 5 is a diagram showing an example of the window displayed on the monitor shown in FIG. 1.

The present embodiment of the game apparatus can be played by two players simultaneously. As shown in FIG. 5, the game apparatus has two windows, each of which is described above, opened in and displayed on the screen of the monitor 28. During the game, the image indicated in each window corresponds to a real-time image as defined in the present invention.

The operation of the game apparatus according to the present invention will be explained hereinlater.

Figure 6:
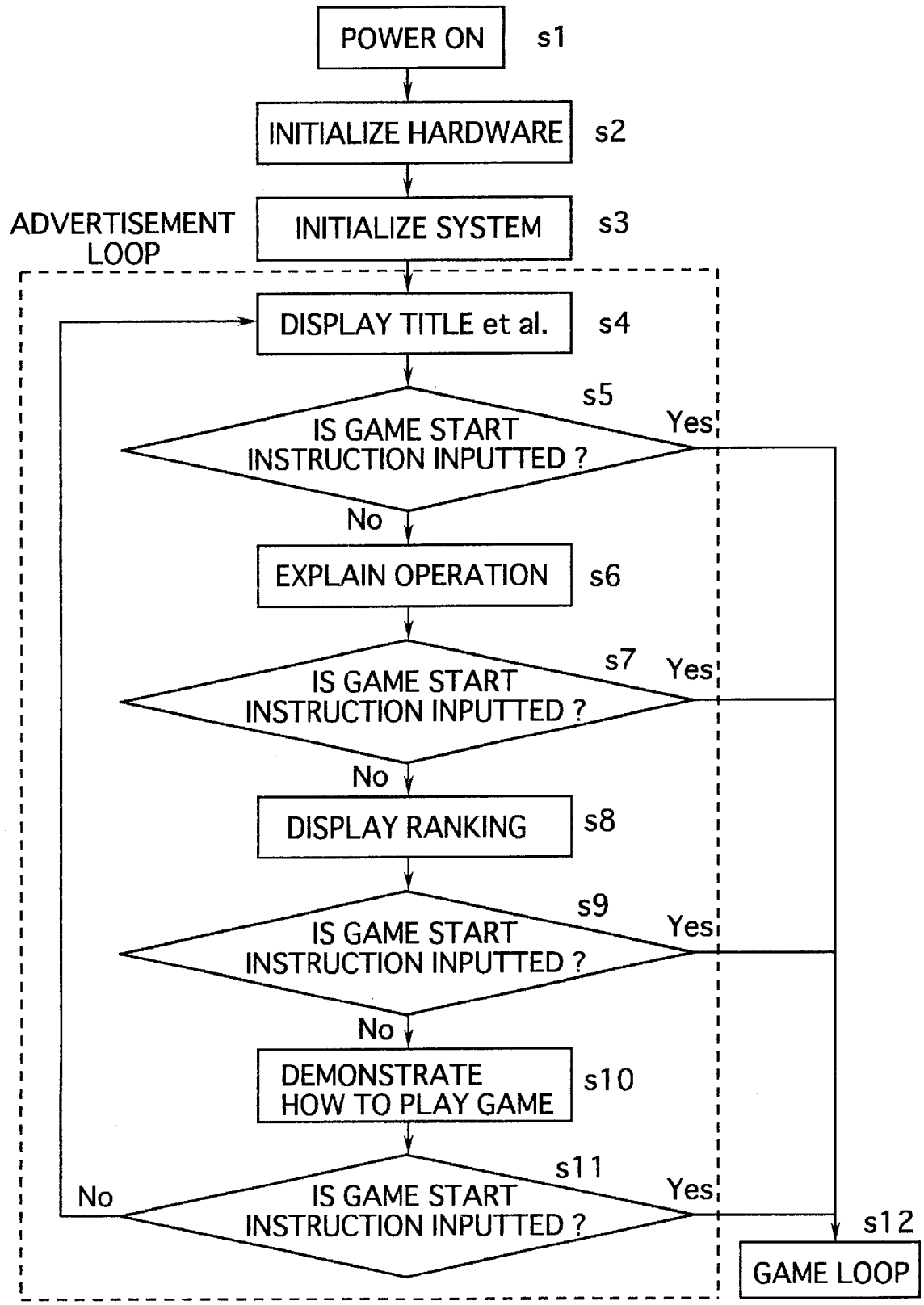
FIG. 6 is a main flowchart showing the overall flow of a program executed by the game apparatus shown in FIG. 1.

FIG. 6 is a flowchart showing the overall flows of controlling the present game apparatus. As shown in FIG. 6, when the power of the game apparatus is turned on in the step s1, the hardware of the game apparatus is initialized in the step s2. The system of the game apparatus is also initialized in the following step s3. When there is no error until the system initializing step is performed, there are provided a title and so forth to be displayed in the step s4. Thereafter the explanation of the manner of operating the game is displayed in the step s6. Furthermore, a record of the other players who previously played the game and a rank of the players getting a high score are displayed in the step s8. Next, the demonstration screen is displayed in the step s10. After displaying the demonstration screen for a predetermined time, this step goes back to the step s4 in which the title is displayed. The start instruction is inputted through the control panel 20 by the player in the steps 4 through 10, thereby going to a game loop (s12).

The process of the game loop in the step s12 in FIG. 6 will be explained hereinafter with reference to FIG. 7 of the drawings. There are some events described below which are watched throughout the game loop until the game is over. The process shown in FIG. 7 is composed so as to be performed at a predetermined cycle corresponding to a drawing cycle (1/60 seconds) of the process of drawing the image into the frame buffers 124 or 126.

Figure 7:
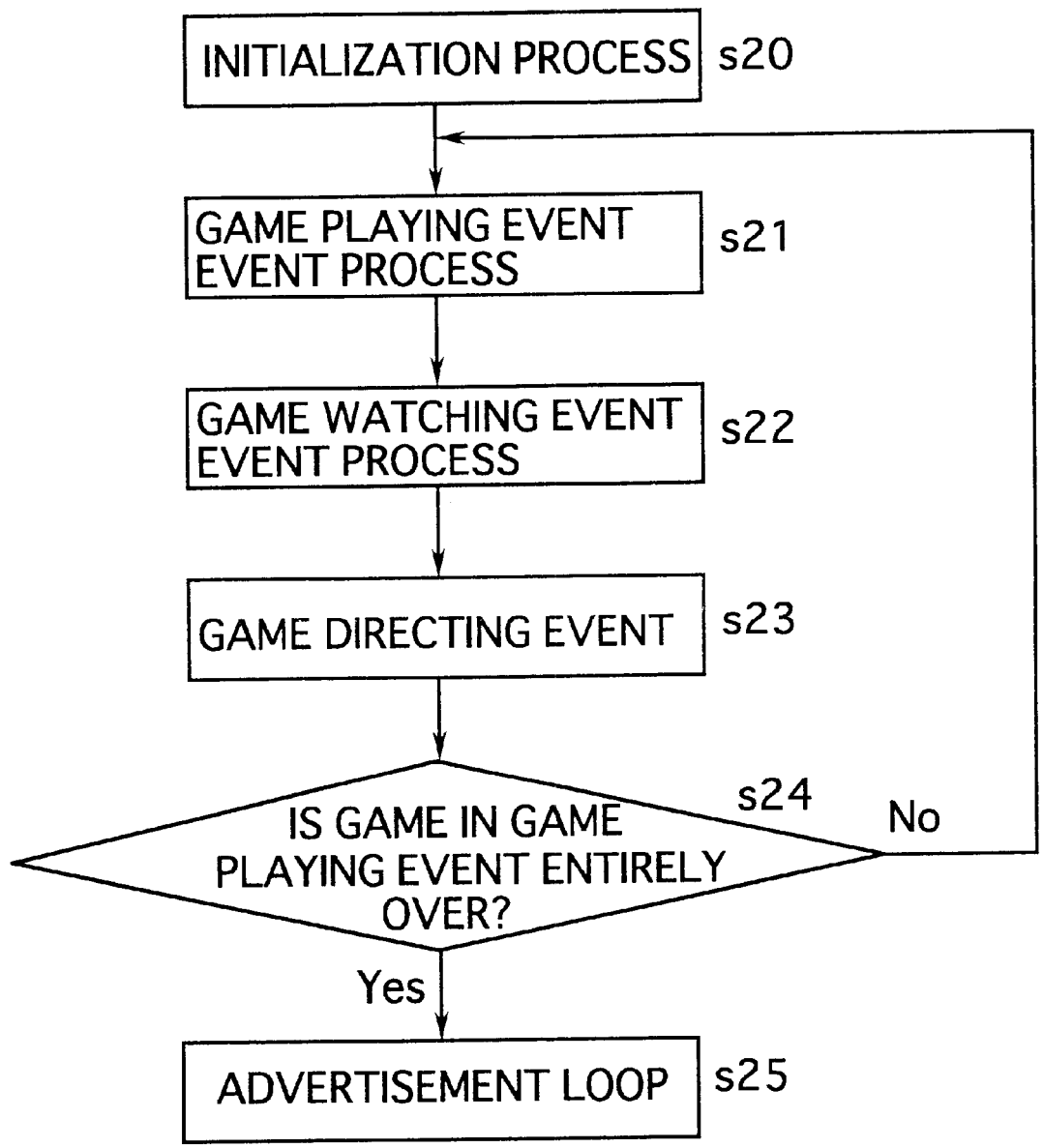
FIG. 7 is a flowchart showing the flow of the game loop shown in FIG. 6.

The game loop comprises the steps as shown in FIG. 7. When the control enters into the game loop, the initialization process is performed in the step 20, as shown in FIG. 7. Then, the step 20 successively goes to the step s21 of processing a game playing event, the step s22 of processing a game watching event and the step s23 of processing a game directing event which will be described hereinafter. Thereafter the judgment is made upon whether the game playing event is entirely terminated or not in the step s24. When the event is entirely terminated, this step goes back to the advertisement loop (s25). When the event is incompletely terminated, this step goes back to the step s21 of processing the game playing event.

Figure 8:
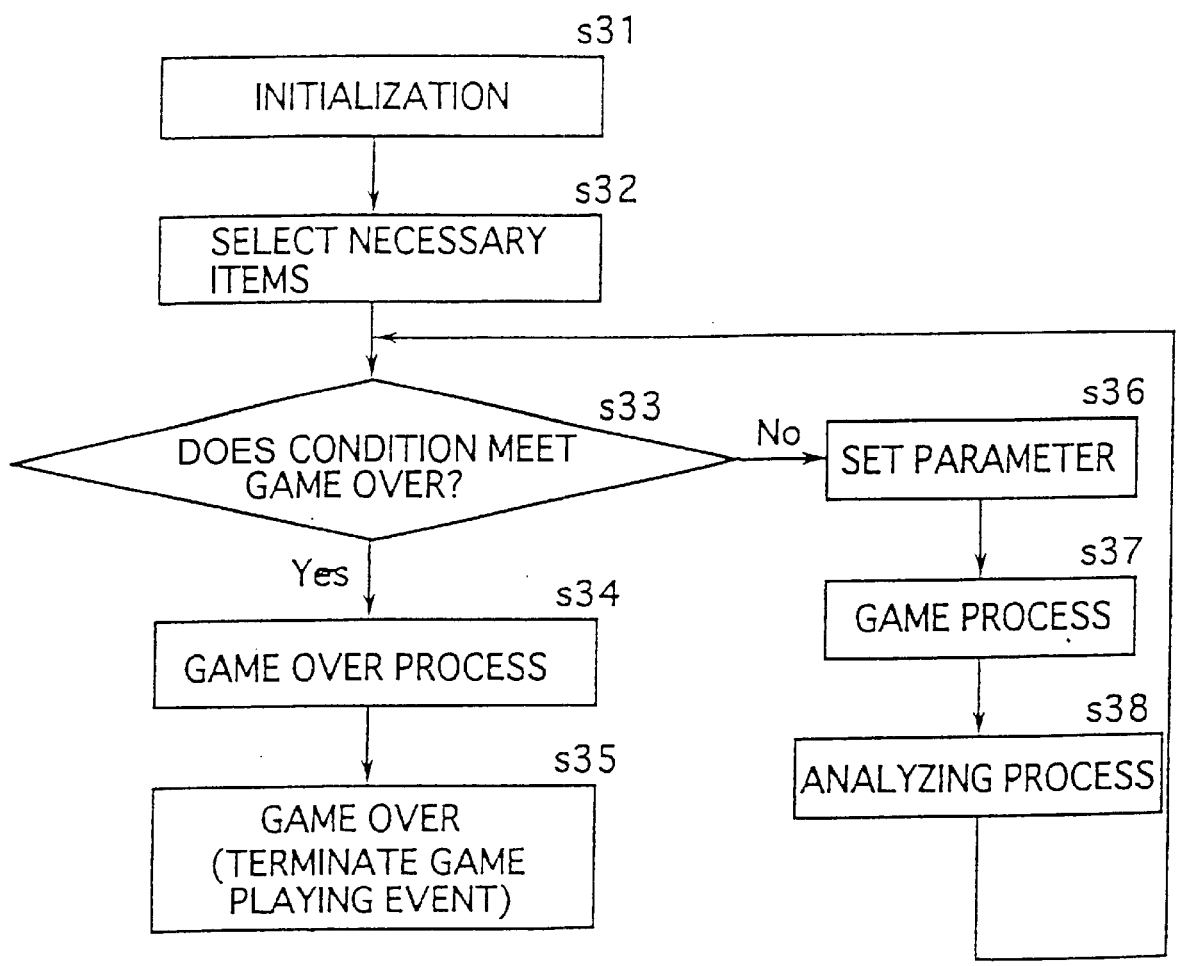
FIG. 8 is a flowchart showing the flow of the game playing event shown in FIG. 7.

Referring now to FIG. 8 of the drawings, the processes of the game playing event in the step s21 shown in FIG. 7 will be explained hereinlater. The game playing event serves as a main process of this game and is watched throughout the game loop until the game is over. The process shown in FIG. 8 is also composed so as to be performed at a predetermined cycle corresponding to the drawing cycle.

The process of game playing event comprises the steps as shown in FIG. 8.

When the control is passed from the game loop to the process of the game playing event, the initialization for staring the game is performed in the step s31, as shown in FIG. 8. Then, necessary items to play the game are selected in the step s32. In the following the step s33, the judgement is made upon whether the game is over or not. When the judgment is made upon that the game is over, the game over process is performed in the step s34 and then the game playing event is terminated in the step s35. When the judgment is made upon that the game is not over, the step proceeds to the step s36 in which predetermined various parameters are set and then goes to a game process in the step s37. The game process is terminated to go to an analyzing process in the step s38 in which various game scores are obtained by calculating a ranking or classes each representative of a skillful grade of the game. The analyzing process is terminated to go back to the process of judging whether the game is over or not in the step s33.

Figure 9:
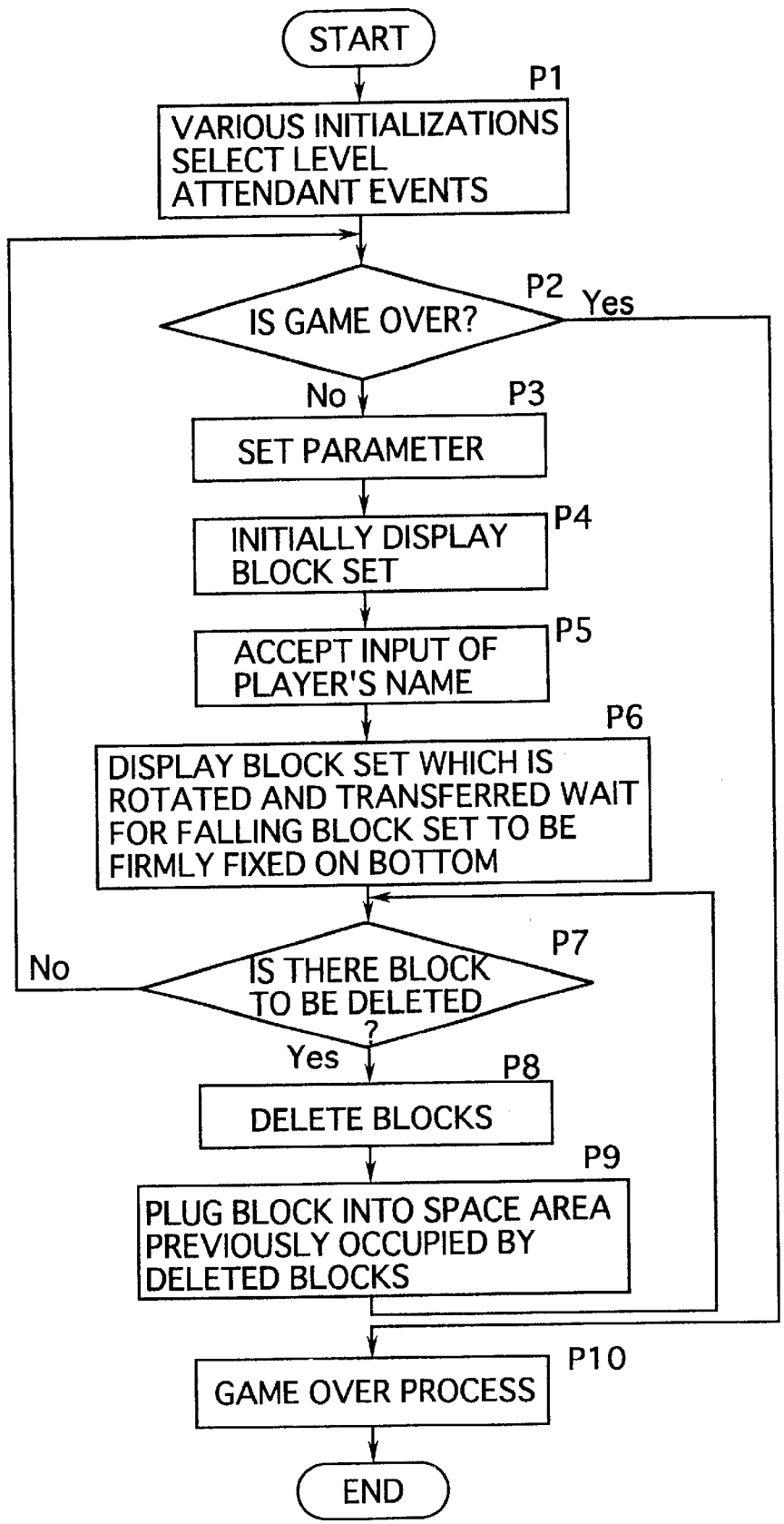
FIG. 9 is a flowchart showing the flow of the game process shown in FIG. 8.

Referring to FIG. 9 of the drawings, the game process of the step s37 will be explained hereinlater. FIG. 9 shows the overall flows of process of controlling the game when the player is playing the game.

The game process comprises the steps as shown in FIG. 9. In the step P1, various initializations are performed, a level is selected and predetermined attendant events are performed at the start in the game process. In the step P2, the judgement is made upon whether the game is over or not. When the judgement is made upon that the game is over, the game over process is performed in the step P10. As a result, the game is terminated. When the judgement is made upon that the game is not over, predetermined parameters are set in the step P3. In the following step P4, a block set is displayed in the window. In the step P5, predetermined instructions are accepted so that the player can input the predetermined instructions to operate the displayed block set to rotationally shift and move if necessary. At this time, the instructions inputted by the player are stored as information for use of process of replaying the game as described below. While the block set is rotationally shifted or moved in accordance with the instructions inputted by the player and displayed, this block set is falling and then stacked onto the blocks in the window in the step P6. In the following step P7, the judgment is made upon whether there is a block to be deleted or not. When the judgement is made upon that there is no block to be deleted, this step goes back to the step P2 of judging whether the game is over. When the judgement is made upon that there are some blocks to be deleted, the blocks are deleted in the step P8. This operation of deleting the blocks means that, but in detail will be explained hereinlater, the same kinds of blocks are linked together on an unbroken line, thereby making these linked blocks to be deleted from the window. When the blocks are deleted, a predetermined animated cartoon, for instance, in which the deleted blocks are indicated being rotated in a flash, may be inserted into the screen. Alternatively, this animated cartoon may be canceled in response to the player's instruction for falling the block set at high speed. This operation of falling the block at high speed are performed by operating a control lever, a control button or direction keys, with which the control. panel 20 are provided, so that the block set can be moved downward in the screen of the monitor. After the blocks are deleted, the blank area corresponding to an area occupied by the deleted blocks is plugged by the other blocks in the step P9. Then this step goes back to the step P7 in which the judgement is made upon whether there is a block to be deleted or not.

The process of game watching event which are watched in the game loop until the game is over will be explained hereinlater. The game watching event comprises three events consisting of a replay watching process, a grade approving process and a recognition disturbing process. The grades described below mean the classes each representing the level of the player's skill in playing the game.

Figure 10:
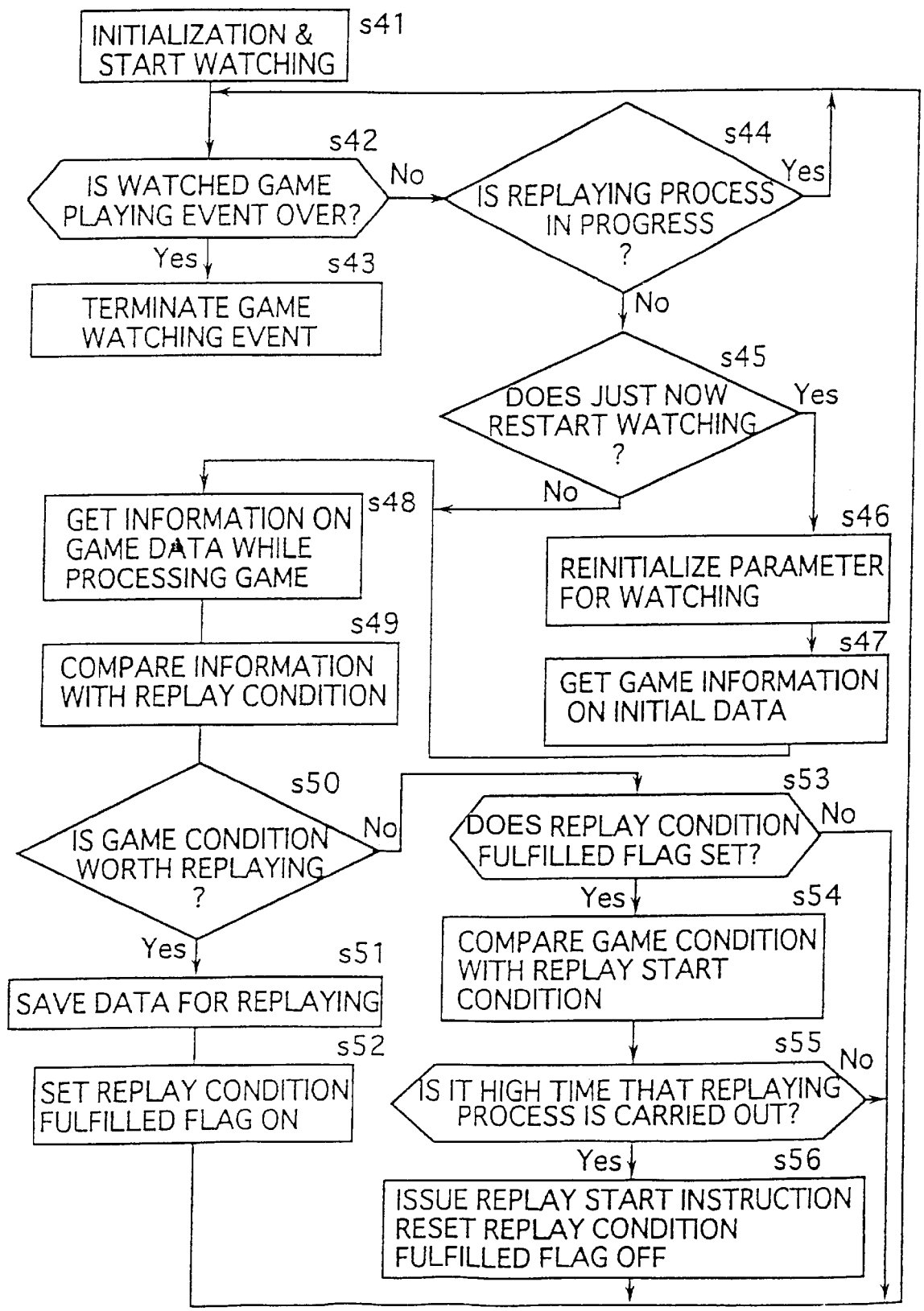
FIG. 10 is a flowchart showing the flow of the replay watching process in the game watching event shown in FIG. 7.

Referring to FIG. 10 of the drawings, the replay watching process will be explained hereinlater. The processes shown in FIG. 10 are also composed in accordance with the drawing duration.

When the control is passed to the process of game watching event from the game loop, the initialization process is performed in the step s41, as shown in FIG. 10. Then the step s41 proceeds to the step s42 in which the judgement is made upon the game is over or not. When the judgment is made upon that the game is over, the game watching event is terminated at the step s43. When the judgment is made upon that the game is not over, the judgment is made upon whether the replay process is proceeding or not in the step s44.

When the judgment is made upon that the replay process is proceeding, the step s44 goes back to the step s42 of the game over judging process. When the judgment is made upon that the replay process is not proceeding, the step s44 goes to the step s45 in which the judgment is made upon whether the watching just restarts or not. When the watching just restarts, the step s44 goes to the step s48 of process of obtaining information during the game. When the watching does not just restart, the step s44 goes to the step s46 in which predetermined parameters for watching is initialized again. In the following step s47, the game information is obtained. Then the step s47 goes to the step s48 of process of obtaining information during the game.

There are various kinds of game information in the step s47, which will be described below. The game information includes color and condition of the blocks each arranged on each grid in the window, color and condition of the falling block set, color of the block set which falls subsequently, position of the falling block set, the arrangement pattern of the blocks in the falling block set, the degree of difficulty, a level, the number of the blocks which have been deleted until this time, flags and counters for the game and so forth.

The information on the game in the step s48 in processing the game may include information on instructions given by the player, a condition of the game play event described below, the number of blocks which are deleted and linked resulting from one instruction, and a flag indicating that the blocks are deleted by a special block as well as the aforementioned information.

In the next step s49, the replay condition, which is used for judging whether the instruction is worth replaying the game or not, is compared with the player's instruction. In the step s50, the judgment is made upon whether the instruction is worth replaying the game or not.

When the judgement is made upon that the instruction is worth replaying the game, the data for replaying the game are stored in a determined recording media for the last 10 seconds in the step s51. In the step s52, the flag which indicates that the replay condition is fulfilled is set. The step s52 goes back to the step s42 of process of judging the game over. When the judgement is made upon that the instruction is worthless replaying, the judgment is made upon whether the flag which indicates that the replay condition is fulfilled is set or not in the step s53. When the flag is not set, the step s53 goes back to the step s42 of process of judging the game over. When the flag is set, the step s53 goes to the step s54 in which the instruction is compared with the replay start condition.

The replay approval condition in the step s49 means that, for instance, there are caused more than three links by placing a block set at one try, or the number of blocks which is deleted by placing the block set at one try attains a predetermined level. Alternatively, the game program stored into the game ROM 16 shown in FIG. 1 may be the other games such as a fighting game, a car racing game or a baseball playing game. In this case, the replay approval condition may be described hereinlater.

In the car racing game, the condition may be assumed that the car is bumped against the wall or that the car jumps more than a predetermined distance. In the fighting game, the condition may be assumed that there is taken a specified technique, that there is a knockout or that there are taken sequential techniques. In the baseball playing game, the condition may be assumed of hitting a home run or causing a close play.

The data for replaying the game in the step s51 mean information on the aforementioned game and information during the game. The replay start condition described in the step s54 means, for instance, that the replay condition approval flag is set, that the player is "at leisure" i.e., the player can pay attention to something in consideration for the number of blocks existing in the window or the speed at which the blocks falls, or that there is no block to be deleted even if the falling blocks would be placed at anywhere.

In the step s55, the judgement is made upon whether the game should be replayed or not. When the judgment is made upon that the game should not be replayed, the step s55 goes back to the step s42 of game over judging process. When the judgment is made upon that the game should be replayed, the replay start instruction is issued and the replay condition fulfilled flag is reset in the step s56. Thereafter, the step s56 goes back to the step s42 of game over judging process.

Figure 11:
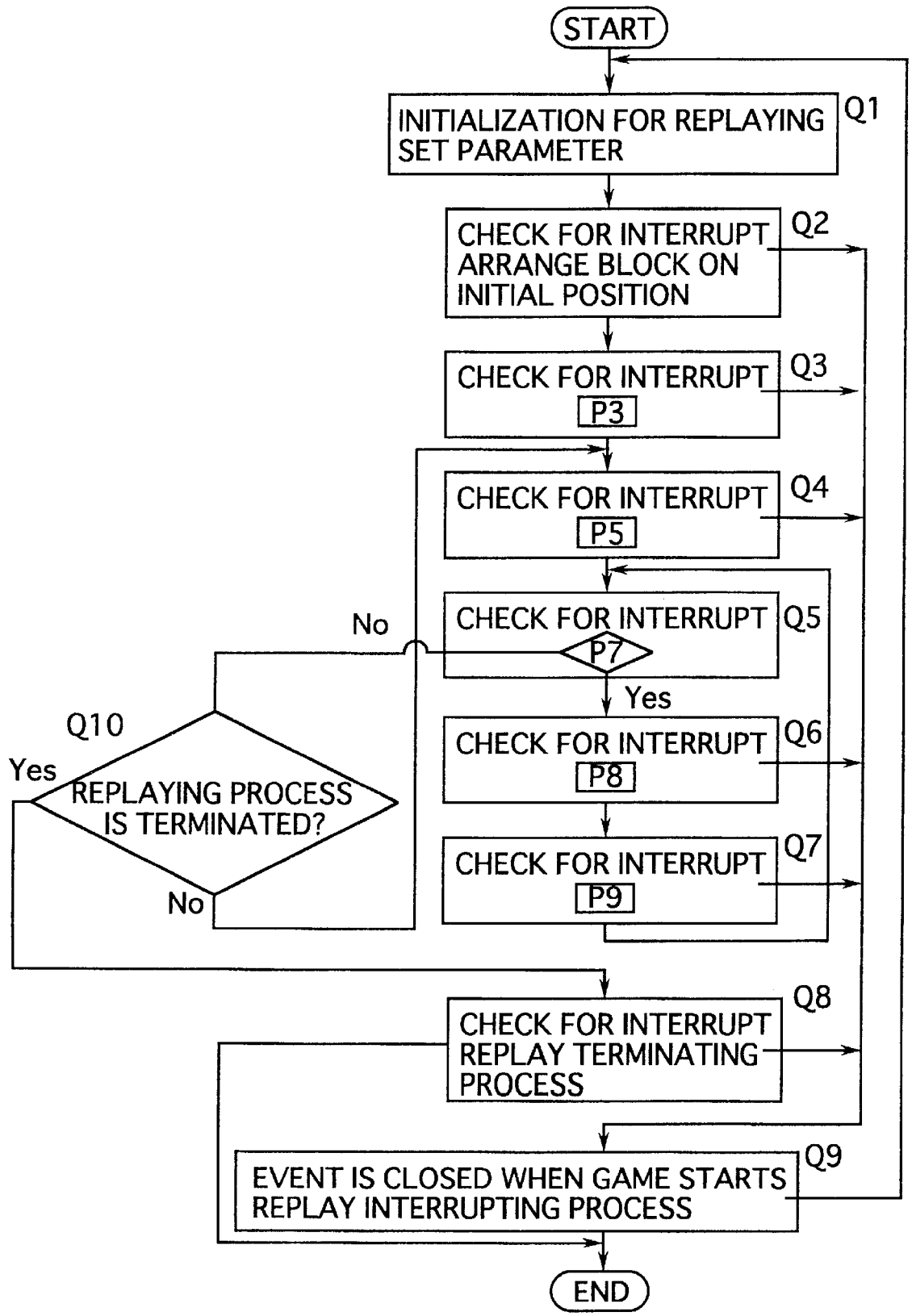
FIG. 11 is a flowchart showing the flow of the replay process watched by the game replaying event shown in FIG. 10.

The replaying process which is watched by the above replay watching process is shown in FIG. 11. FIG. 11 shows overall flows of replaying process from beginning to end.

In FIG. 11, the replaying process comprises the step Q1 of setting an initialization parameter for replaying, the step Q2 of arranging blocks in the initial condition, the steps Q3, Q4, Q5, Q6 and Q7 which are the same as the steps P3, P5, P7, P8 and P9 in FIG. 9, respectively, the step Q10 of judging whether the replaying process is terminated or not, the step Q8 of terminating the replaying process and the step Q9 of closing the events which is, for instance, caused by the instruction to start game. Throughout the steps Q2 to Q8 of the replaying process, the interrupt is checked at each step at all time. When the interrupt occurs, each of the steps proceeds to the step Q9. When the judgement is made upon that the replaying process is terminated in the step Q10, the step 10 proceeds to the step Q8.

It is understood from the flows described above that the replaying process shown in FIG. 11 comprises the same steps as the block deleting step of game process shown in FIG. 9 and the other steps as follows. The interrupt is checked at all time.

When the interrupt is caused, the replaying process is immediately interrupted to go to the aforementioned game process.

Figure 12:
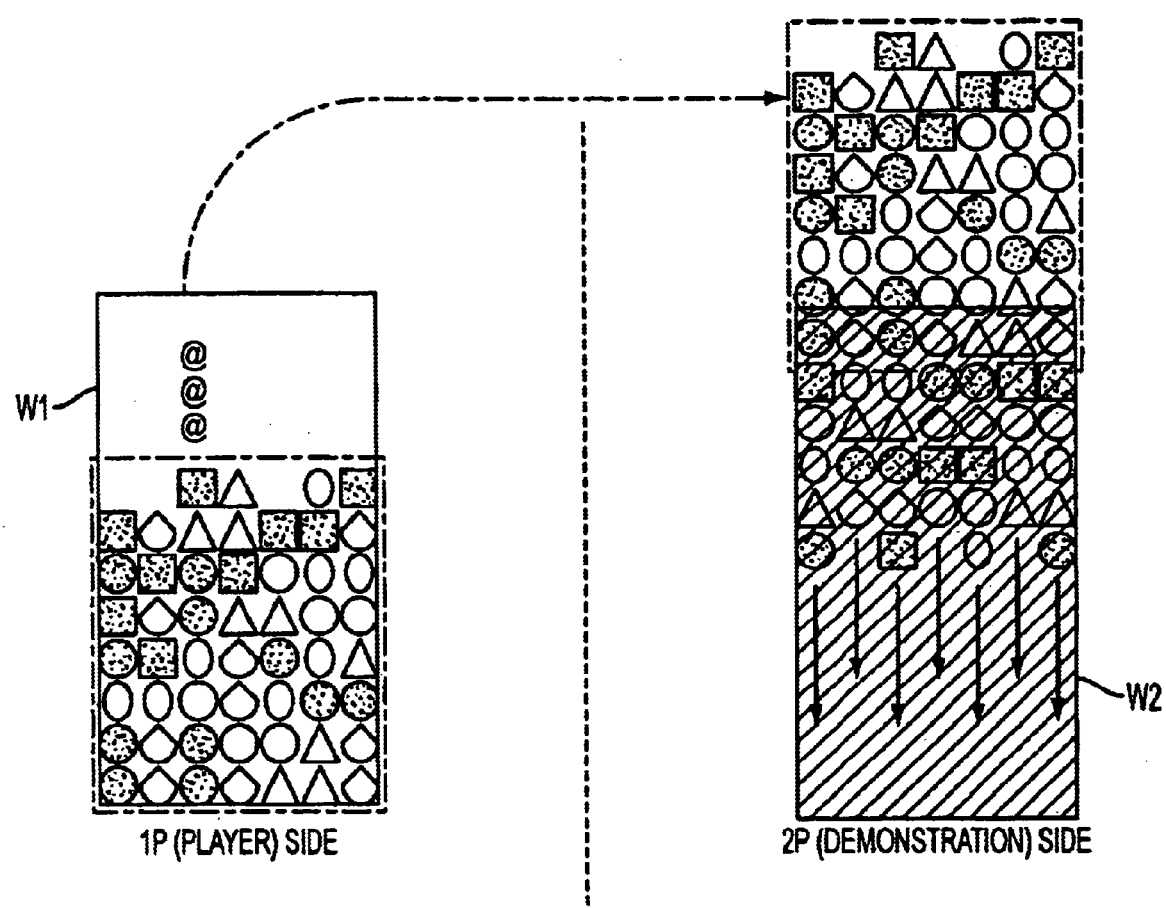
FIG. 12 is a diagram showing images displayed in the window during processing the replay process shown in FIG. 11.
Figure 13A:
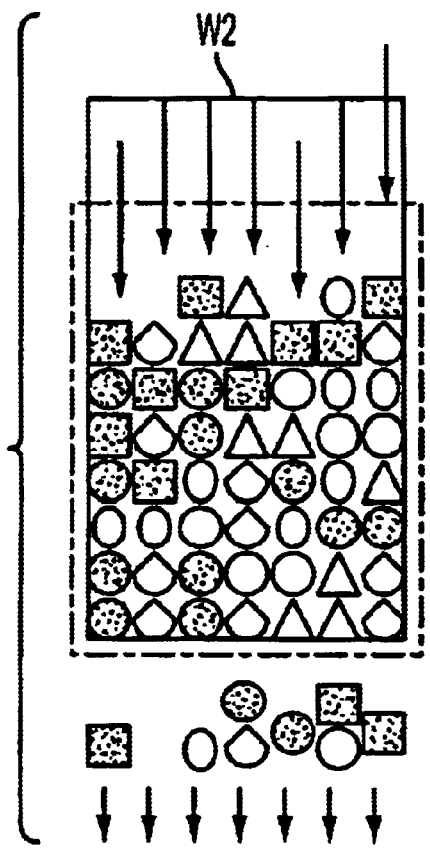
FIGS. 13(*a*)–(*c*) is a diagram showing the images displayed in the window following the images shown in FIG. 12.
Figure 13B:
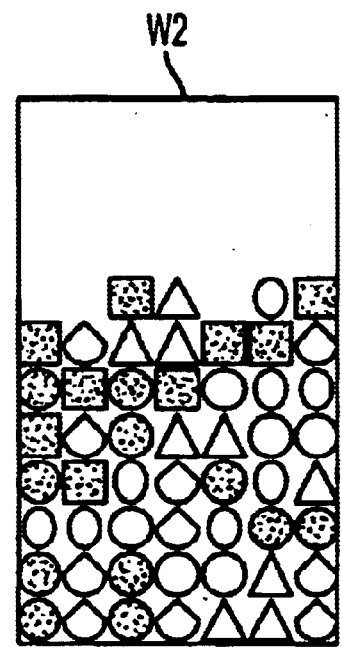
Figure 13C:
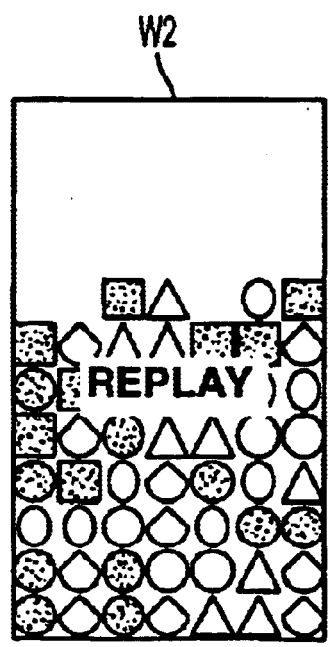
Figure 14A:
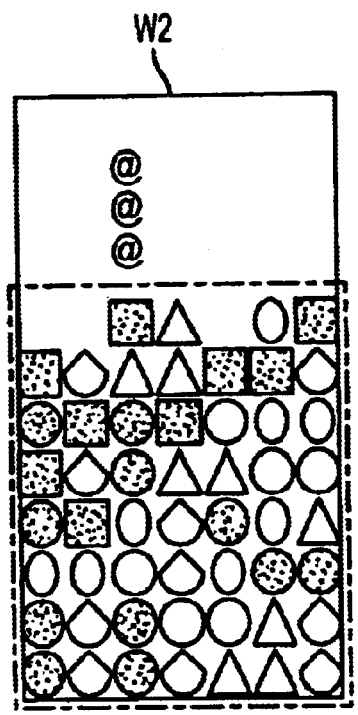
FIGS. 14(*a*)–(*c*) is a diagram showing the images displayed in the window following the images shown in FIG. 13.
Figure 14B:
Figure 14C:
Figure 14D:
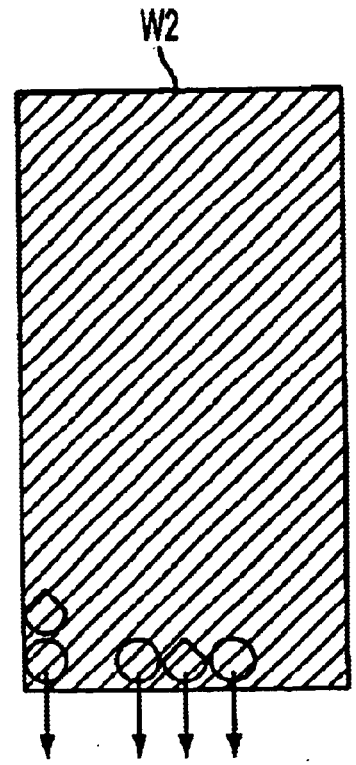

"The above replaying process will be exemplified in concrete screens hereinlater. As shown in FIG. 12, there are two windows W1 and W2 to be displayed on the screen of the monitor 28 during the game. The player watches the window W1 to play the game, but does not watch the window W2 in which the demonstration is displayed. There is darker brightness in the demonstration screen in the window W2 compared with the brightness in the screen displayed in the window W1 to play the game. When the player operates the special blocks, which are represented by the characters "@" in the window W1 shown in FIG. 12, to cause seven links sequentially, the demonstration screen displayed in the window W2 as shown in FIG. 12 is interrupted. Then, another screen, in which the blocks arranged in the window W1 before causing the links is displayed, is displayed in the window W2 as shown in FIG. 13(*a*). In the window W2, the replaying game screen which represents the blocks arranged in the window W1 before causing these links is displayed as shown in FIG. 13(*b*). At this time, the brightness of the window W2 becomes the same as that of the screen for playing the game which is brighter than the screen for displaying the demonstration. Furthermore, the replaying game screen is reproduced in company with characters "REPLAY" as shown in FIGS. 13(*c*), 14(*a*)–(*c*)."

At this time, the number of links displayed as shown in FIG. 14(*b*) is incremented as advancing the linking which is reproduced. The sound which represents the blocks is exploded is further outputted. Finally, the message of blessing, for example, "EXCELLENT!" or "WONDERFUL!", is displayed as shown in FIG. 14(*c*). The replaying of the links is completed thereby making the brightness of the background dark and displaying the demonstration screen as shown in FIG. 14(*d*). In the aforementioned description, while the replaying game image is displayed in the window W2, the sound representing that the blocks is exploded is outputted. The sound may be the same as that utilized for the window W1 during the game. The sound may be emphatically outputted as the particular sound (representing blocks is exploded) has a volume to be turned up. The sound may be, but not limited to, relevant to the replay image, the other sounds, for instance, a fanfare for urging one to attract.

When there are caused larger number of links during displaying the relaying game screen, the replaying game screen is interrupted. The larger number of links are taken precedence to be reproduced. When an image, which is newly judged to be worth replaying, is displayed in the window W1 the during displaying the replaying game screen, the new image is stored for replaying. Then the stored image may be displayed, when the player has some time to spare for playing the game, for example, the number of blocks in each column is five stages or less, or the speed of falling the block set is a predetermined level or below.

Figure 15:
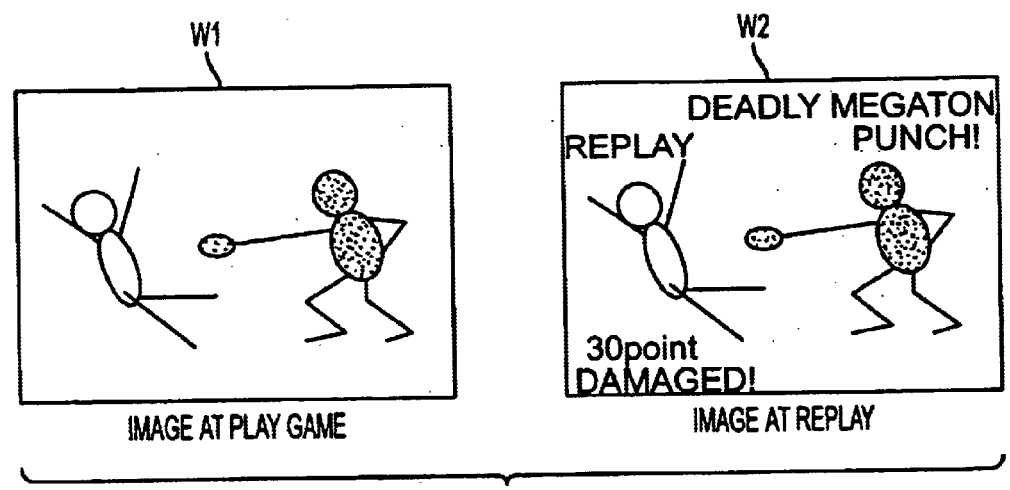
FIG. 15 is a diagram showing the images displayed in the window when the game program executed by the game apparatus shown in FIG. 1 includes a fighting game.

There are provided with various kinds of sound or display information to be appended to the display image in the window W2 in the above replaying. The game program is stored in the game ROM 16 of the game apparatus shown in FIG. 1. It will be described hereinafter that the game program may be exemplified by the fighting game. As shown in FIG. 15, it may be thought that the explanation of the offence actions repeatedly taken by the player with such as letters or an image displayed in replaying screen or with a sound. Furthermore, the replaying image may be subdivided into smaller parts to regulate speed of displaying, reversely reproduced, displayed by alternating an angle from the viewer point to the visual field, or repeatedly reproduced.

It is described above, but not limited to, that the replaying image is displayed on one of two screens of the monitor 28 without overlapping each other. The replaying image may be displayed on the window which is opened in the screen on which the playing game is displayed. In this case, the game screen may have a window which serves as a screen for displaying information unrelated to the game, such as an advertisement screen displayed in the background. The replaying image may be displayed on this window. Moreover, although there is shown one monitor 28 in FIG. 1, there may be provided another monitor for a second player. The replaying image may be displayed on this monitor. Alternatively, there may be provided a second monitor not for the second player but only for the use of replaying to reproduce the replaying image. Furthermore, there may be provided a system comprising a plurality of the game apparatuses shown in FIG. 1 which are linked with each other through a network so as to make it possible for a plurality of players to play a match against each other. In this case, the replaying image may be displayed on the monitor of the game apparatus which is not in use.

The grade approving process shown in FIG. 16 will be explained below. The process shown in FIG. 16 is also composed so as to be performed at a predetermined cycle corresponding to the above drawing cycle.

Figure 16:
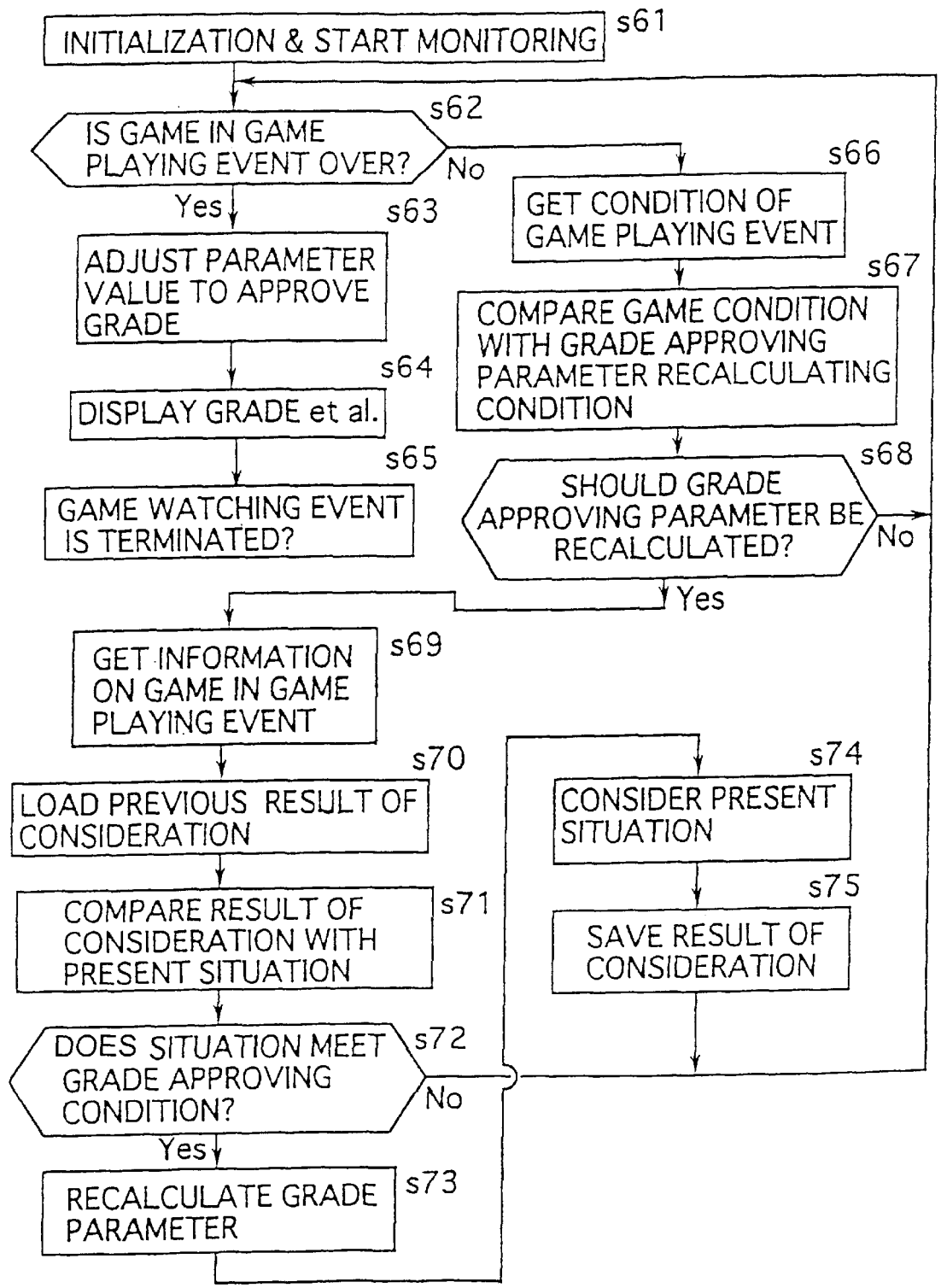
FIG. 16 is a flowchart showing the flow of the grade approving process in the game watching event shown in FIG. 7.
Figure 17:
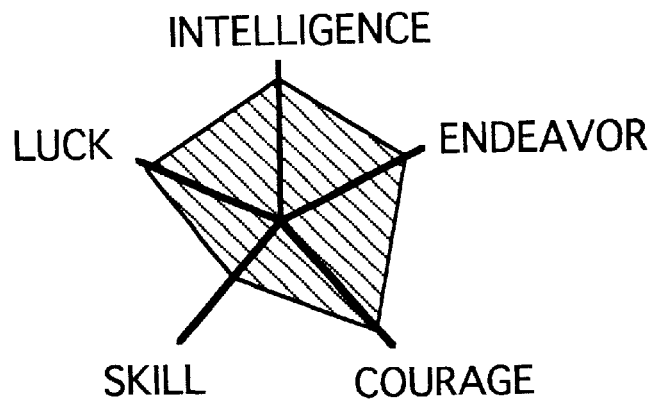
FIG. 17 is a diagram showing a example of the display form when the grade approved by the processes shown in FIG. 16.

The game watching event comprises the steps as shown in FIG. 16 and is watched throughout the game loop until the game is over. In the step s61, the initialization is performed. In the step s62, the judgment is made upon whether the game in the watched game playing event is over or not. When the game is over, the parameter value is adjusted so as to approve the grade in the step s63. In the following step s64, there are displayed, as shown in FIG. 17, the grade (class) approved on the basis of the values of a plurality of parameters and a radar chart showing player's evaluation of playing the game. Thereafter, the game watching event is terminated in the step s65. When the judgment is made in the step s62 that the game is not over, the condition of the game in the game playing event is found in the step s66. In the following step s67, the comparison of the condition with a predetermined recalculating condition of a grade approving parameter value is made.

In this embodiment, the grade approving parameter value above described in the step s67 represents five items including intelligence, endeavor, courage, skill and luck as show in FIG. 17. The manner of getting high level in the evaluation of the intelligence is assumed by way of example to be some cases including: a first case where more than four blocks can be deleted by one instruction; a second case where more than two links are caused by one instruction; a third case where there is no block to be deleted at all but are caused more than one block group within reachable of deleting the blocks. The manner of getting high level in the evaluation of the endeavor is assumed to be a case, for example, where the blocks are deleted as many as possible. The manner of getting high level in the evaluation of the courage is assumed to be a case, for example, where the block set is dropped at high speed. The manner of getting high level in the evaluation of the skill is assumed by way of example to be some cases including a first case where the special block is taken into pieces; and a second case where the special block is let alone be dropped without rotationally shifting or moving the block set sideways. The manner of getting high level in the evaluation of the skill is assumed by way of example to be some cases including a first case where the links are caused as many as possible; and a second case where all of blocks are deleted in the window.

It is thought that the manner of evaluating the above intelligence and courage is assumed that the conventional manner of evaluating the game on the basis of only the results is added to the new manner of evaluating the instruction given by the player or the control itself. In this embodiment, it is thought that the instruction given by the player itself is evaluated but apart from the variation of the game situation incidentally caused by the instruction. Such as instruction is assumed to be the above high speed dropping the block set. Moreover, when the game situation is invariable except for the variation directly caused by the instruction given by the operator during the game, it is thought that the instruction is directly evaluated. This case is assumed to be a case where the block group is caused within reachable of deleting the blocks as described above. Furthermore, the first instruction followed by the second instruction sequentially inputted by the operator during the game. When the variation in a game situation is larger than a minimum variation in the game situation which can be caused by the first instruction before the second instruction is inputted, the first instruction is directly evaluated. This case is assumed to be a case where a plurality of links are caused by one instruction for the arrangement of the block set.

In the step s68, the judgment is made upon whether the grade approving parameter value should be recalculated or not. The judgment is made upon that the grade approving parameter value is unnecessary to be recalculated, thereby going back to the step s62 of judging the game over. When the judgment is made upon that the grade approving parameter value should be recalculated, the information on the condition of the game playing event is acquired in the step s69. In the following step s70, the precious consideration result is loaded in the step s70. The previous consideration result is compared with the game condition in the step s71. In the following step s72, the game condition is compared with the condition of approving the grade in the step s72. The game condition is not satisfied with the condition, thereby going back to the step s62. When the condition is met, the grade approving parameter value is recalculated in the step s73. In the following the step s74, the present game condition is considered on the basis of the arrangement of the jewels after deleting the blocks and causing the links and the information on the flowing falling blocks so as to estimate an ideal landing of the block at the next time. Then the consideration result is saved in the step s75. The control is returned back to the step s62.

The consideration in the steps s70, s71, s74 and s75 will be explained hereinlater. In the present game, this consideration is achieved by acquiring those variable as described below for 21 patterns, i.e., 3 patterns of the arrangement of the block in the block set and 7 patterns of the arrangement at which the block set is positioned on the bottom in the window, 3×7=21. In all of these cases, the variable includes the number of deleted blocks, the number of links, the index of the effective ways of positioning the block (e.g., creating the arrangement for waiting, positioning the same blocks in color, or creating the origin to the link), the height of each of the columns (in relation to the inspection of the trick such as a especial block), the number of the blocks for every color, and the number of whole of the blocks (in relation to the inspection of the way of positioning the special block). It is the consideration that on the basis of these variations, the rank of the appropriate way of arranging the blocks is determined in concerning to the above 21 patterns of the arrangement. Therefore, the judgement is made upon whether the number of the blocks which has been deleted or formed into the links approaches the number of the blocks which can be deleted or form into the links resulting from positioning the ideal landing point of the block as near as possible.

Here, "ideal landing point of the block" is an ideal point which is determined in the consideration routine which is executed by the CPU to determine (when the CPU consideration routine in which the player plays with the CPU). "Ideal" point means that the player can be arrange the falling block by rotating (the arrangement is changed) or moving, so that most of the blocks can be deleted at this point, or most of the links can be caused at this point. The CPU, in the step s74 shown in FIG. 16, examines the relationships between the color of the blocks previously piled up and the color of the blocks which will fall at next time. Accordingly, the CPU judges whether the point is "ideal" or not according to the above 21 patterns of the arrangement (alternatively, 21×21=441 patterns, or containing the following reconstruction of the arrangement).

There are some situations, which can satisfy the grade approving condition in the step s72, for instance, in the first case where a total number of the deleted blocks exceeds a predetermined level, in the second case where the player can arrange the block set at a most appropriate position, in the third case where the player uses a trick for playing the game, and in the fourth case where the player can rapidly fall the block set. The grade approving the condition may be evaluated on the basis of the individual or comprehensive situations.

The consideration routine is thus performed by the CPU to analyze the present situation on the basis of the judgment made upon what will be caused by the instruction given by the player. This results in the fact that it is possible to real-timely judge the quality of the instruction given by the player and real-timely score in accordance with the game situation.

Figure 18:
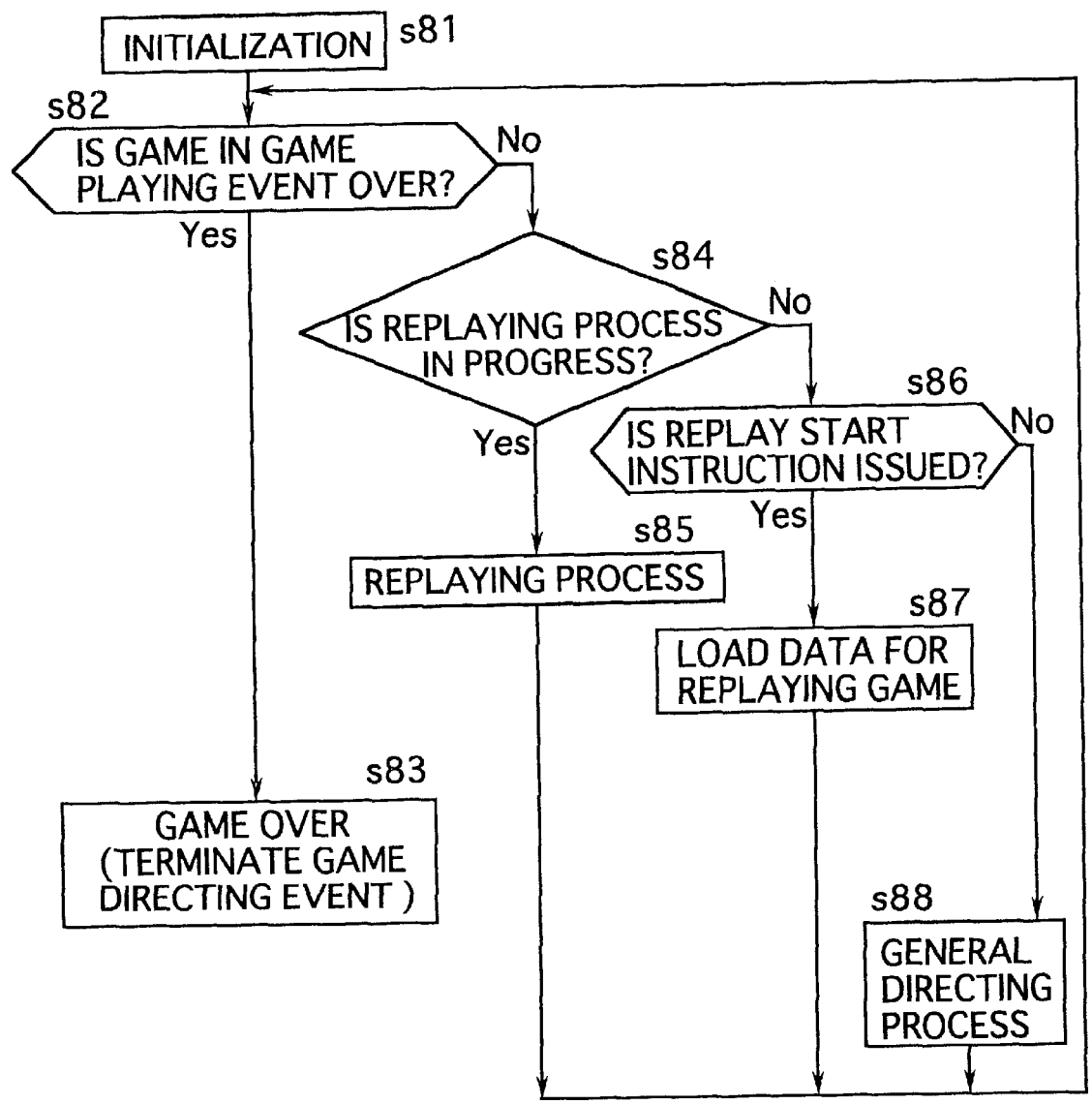
FIG. 18 is a flowchart showing the flow of the game directing event shown in FIG. 7.

Referring to FIG. 18 of the drawings, the game directing event in the step s23 shown in FIG. 7 will be explained hereinlater. The process shown in FIG. 18 is also composed so as to be performed at a predetermined cycle corresponding to the above drawing cycle.

The game directing event comprises the steps as shown in FIG. 18 and is watched throughout the game loop until the game is over. In the step s81, the initialization is performed. In the step s82, the judgment is made upon whether the game in the watched game playing event is over or not. When the judgment is made upon that the game is over, the game directing event is terminated in the step s83. When the judgment is made upon that the game is not over, the judgment is further made upon whether the replaying process is performed or not in the step s84. When the judgment is made upon that the process of replaying the game is preformed, the process of replaying the game continues in the step s85. Then this step goes back to the step s82. When the judgment is made upon that the process of replaying the game is not performed, the step s84 leads to the step s86 in which the judgment is made upon whether the replay start instruction is issued or not. When the judgment is made in the step s86 that the replay start instruction is issued, the data for replaying the game are loaded in the step s87. Then this step goes back to the step s82. When the judgment is made in the step s86 that the replay start instruction is not issued, the general process of directing the game is performed in the step s88. Then this step goes back to the step s82.

The game apparatus shown in FIG. 1 may be used by two players at the same time to competed with each other. It will be explained hereinlater how the players can disturb his or her partner player to play the game. The timing of this process is regarded as the same timing as that of the replaying process. This means that the game playing event includes the partner disturbing process.

Figure 19:
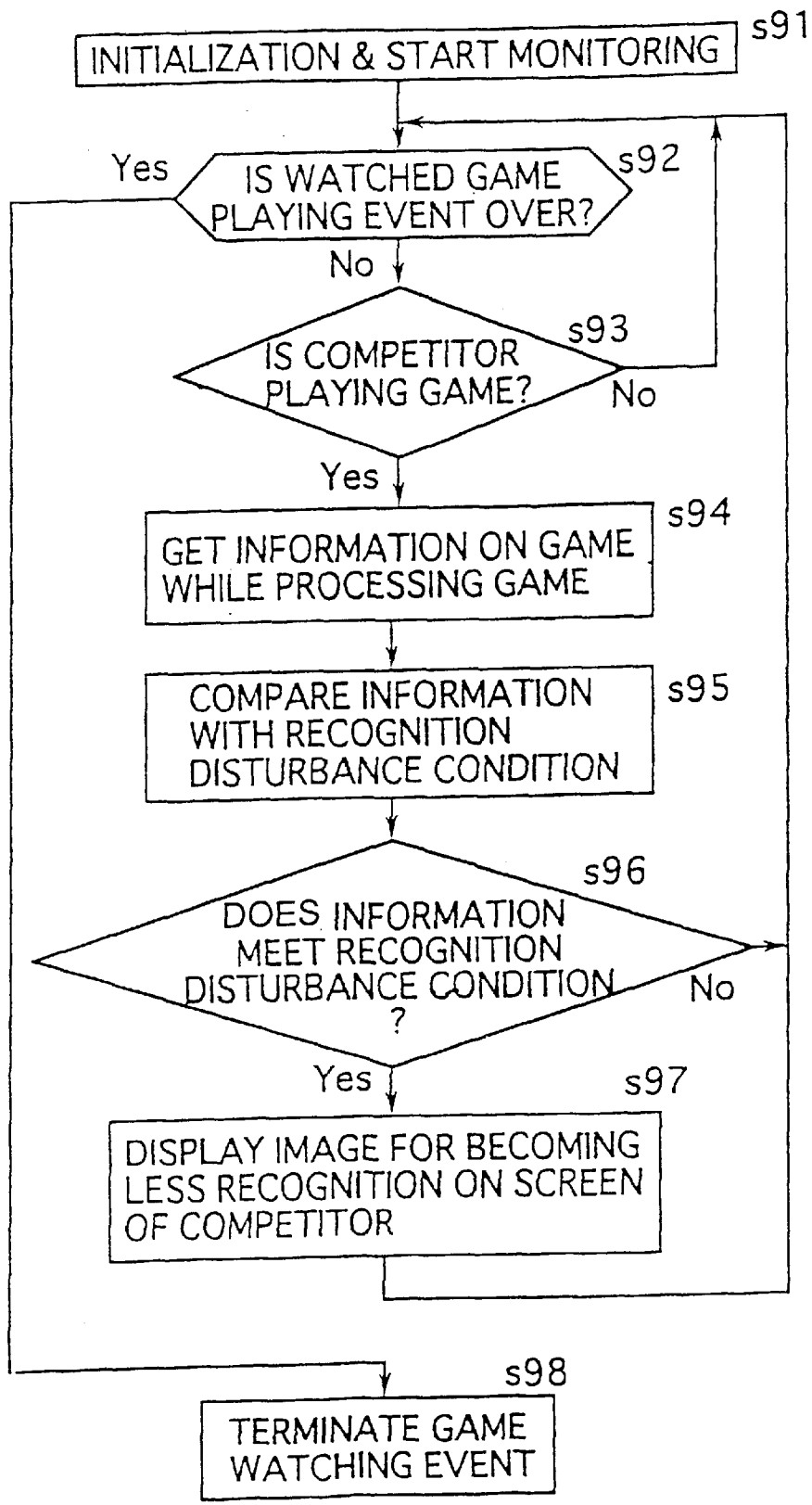
FIG. 19 is a flowchart showing the flow of the recognition disturbing process in the game watching event shown in FIG. 7.

Referring to FIG. 19 of the drawings, the partner disturbing process will be explained hereinlater. The process shown in FIG. 19 is also composed so as to be performed at a predetermined cycle corresponding to the above drawing cycle.

The game monitoring event comprises the steps as shown in FIG. 19 and is watched throughout the game loop until the game is over. In the step s91, the initialization is performed. In the following step s92, the judgment is made upon whether the game in the watched game playing event is over or not. When the judgment in the step s92 is that the game is over, the game monitoring event is terminated in the step s98. When the judgment in the step s92 is that the game is not over, the judgment is made upon whether the partner is playing the game or not in the step s93. When the judgment in the step s93 is that the partner is not playing the game, this step goes back to the game over judging process in the step s92. When the judgment in the step s93 is that the partner is playing the game, the step s93 leads to the step s94 in which the information on the game is acquired in processing the game. In the following the step s95, the information is compared with a recognition disturbance condition. When the information fails to satisfy the recognition disturbance condition, this step goes back to the game over process in the step s92. When the information satisfies the recognition disturbance condition, an image capable of making the partner's recognition less is displayed on the screen in the step s97. This step goes back to the game over process in the step s92.

The recognition disturbance condition in the step s95 may be made that, for instance, there are caused more than four links by only one instruction, the special block can be operated, and the stacked blocks are formed into the V-shaped form by deleting the blocks.

There are some situations, which can make the partner's recognition less as described above in the step s97, for instance, in which part of the window of the competitor is masked, the color of the background of the image for the competitor is changed, the brightness of the background of the image for the competitor is changed, the image which is displayed on the player's screen is stored and redisplayed on the screen of the competitor as the background, the block which is displayed in the image on the screen of the competitor and operated by the competitor is transformed, or the color of the block which is displayed in the image on the screen of the competitor and operated by the competitor is changed.

The embodiment thus described above can bring about effects (a) to (y) as described below.

(a) The image, which is decided to be reproduced, is being drawn as a reproduced image, while or at the same time that a real-time image is being drawn, thereby making it possible to reproduce and display a scene, for example, such as a high exciting scene or a noteworthy scene, during the game, as well as to display a real-time image in proceeding the game by actually displaying the drawing information on its screen. This embodiment allows not only an operator but also an audience assembled around the game apparatus to be excited and refreshed by the reproduced image, therefore, the operator can be excited and refreshed moreover, without interrupting the game. As a result, the game surpass itself in exciting and refreshing the operator. The reproduced image can bring about such a felling as excitement or refreshment, thereby causing a gallery's wish to play the game. The game, therefore, becomes more attractive.

(b) The reproduced image is displayed in the window opened on the real-time image, so that the operator can play the game while checking the reproduced image at ease.

(c) The embodiment comprises two display units, on one of which the real-time image is displayed, and on the other of which the reproduced image is displayed. This results in the fact that the unused display device is used effectively for displaying the reproduced image, in the case where the game is played by a plurality of operators to which the display devices are allocated respectively.

(d) The append information relevant to the reproduced image is displayed while the reproduced image is displayed, so that, for instance, it is possible to display the information including an action or score of the game to be displayed in the reproduced image. It is, therefore, possible to exactly notify the operator and the gallery of the information indicated in the reproduced image.

(e) When there is changes of a game situation displayed in the real-time image which exceeds a predetermined level, the image corresponding to the real-time image is reproduced. This results in the fact that it is possible to select only images particularly having a strong feeling of exciting or refreshing or being noteworthy to be reproduced and watched by the operator and the gallery.

(f) The decision is made in response to the instruction inputted by the operator to reproduce the image, therefore, the image required by the operator is reproduced. For instance, it is possible to reproduce an image which is desired by the operator to be shown to the gallery by selecting the image.

(g) The sound relevant to the reproduced image can be outputted at the same time that the reproduced image is displayed. For instance, the same sound as the sound which is outputted when the reproduced image is represented as a real-time image, may be outputted in displaying the reproduced image. Alternatively, particular part of the sound may be more emphasized so as to be distinct from the sound in displaying the real-time image. This results in the fact that it is possible to allow the operator or the gallery to be excited or refreshed moreover by the sound.

(h) When the decision is made that a faculty of the competitor should be impaired, an image for weakening the understanding of the competitor is produced so as to be displayed on the screen. It is therefore difficult for the competitor to recognize the object in the image but it is possible for the competitor to maintain the situation same as the situation when the game still has not been obstructed, so that the competitor can continue to play the game. This means that it is possible to disturb the competitor without interrupting the competitor's feeling of durability in the game. This also means that the game situation may be recovered to the situation same as that when the game is not disturbed according to the control by the competitor, because of the fact that the understanding of the competitor is merely weaken. Consequently, the ordinal attraction of the game can be brought into full extraction.

(i) The understanding of the competitor may be disturbed by masking part of the image for the competitor, therefore, the competitor can estimate the masked part of the image only by recalling the competitor's memory. Consequently, it is possible to cause damage to the competitor due to the memory of the competitor.

(j) The understanding of the competitor may be disturbed by changing the color of the background of the image for the competitor, therefore, it is possible to cause damage to the competitor due to the ability of judgement of the objects when the color of the background of the image is changed.

(k) The understanding of the competitor may be disturbed by changing the patterns of the background of the image for the competitor, therefore, it is possible to cause damage to the competitor due to the ability of judgement of the objects when the patterns of the background of the image is changed.

(l) The understanding of the competitor may be disturbed by changing the brightness of the background of the image for the competitor, therefore, it is possible to cause damage to the competitor due to the ability of judgement of the objects when the brightness of the background of the image is changed.

(m) The understanding of the competitor may be disturbed by reproducing the image stored in the storing means for the background of the image for the competitor, the background including objects which are similar to the objects to be controlled by the competitor, therefore, the competitor should distinguish his own objects from the objects in the background. Consequently, it is possible to cause damage to the competitor due to the faculty to distinguish his own objects from the objects in the background.

(n) The image having an object in the screen of the competitor is transformed so as to weaken the competitor's understanding. Therefore, it is possible to cause damage to the competitor due to the faculty to judge the transformed objects.

(o) The image having an object in the screen of the competitor is changed in color so as to weaken the competitor's understanding. Therefore, it is possible to cause damage to the competitor due to the faculty to judge the object changed in color.

(p) The game apparatus is adaptable to a puzzle game in which the player is required to instantaneously recognize types and arrangement of the objects. The competitor is disturbed but has no feeling of durability in his game. This point of view leads to the fact that the present invention become more effectiveness.

(q) On the basis of the instruction procedure formed with a series of instructions which is estimated so as to be appropriate to situation in a virtual space, the evaluation of the operator's control is made. Therefore, by using the way of consideration made by the CPU in which it is possible to assume and judge a future situation, the result operated by the player can be evaluated. As a result, the quality of the player's control is judged in accordance with the game situation, so that the score can be real-timely obtained.

(r) The evaluation of the instructions themselves given by the operator can be made regardless of a variation of a game situation incidentally caused by the instructions. For example in the puzzle game, the high speed falling of the object is directly evaluated, thereby making it possible to perform unconventional manner of evaluating the control. Consequently, the items for selecting the instructions which can improve the game score can increase.

(s) When a game situation is invariable except the variation directly caused by the instruction given by the operator, the instructions themselves can be evaluated. For example in the puzzle game, the instruction for creating the block group within reachable of deleting the blocks is directly evaluated, thereby making it possible to perform unconventional manner of evaluating the control. Consequently, the items for selecting the instructions which can improve the game score can increase.

(t) When there is the variation in a game situation is larger than a minimum variation in the game situation which can be caused by the first instruction before the second instruction is inputted, the first instruction itself can be evaluated. For example in the puzzle game, a plurality of links are caused by one instruction for positioning the block set is directly evaluated, thereby making it possible to perform unconventional manner of evaluating the control. Consequently, the items for selecting the instructions which can improve the game score can increase.

(u) The predetermined classes each representing a skillful grade of operators can classify the skillful grades of the operator into one of said classes and represent the result of the evaluation as said classified class. Therefore, the rank is determined in accordance with the way of controlling during the game rather than the result of the game. Moreover, the skillful grade of the game can be cleared with no influence of the luck.

(v) The result of the evaluation is represented by a radar chart having a plurality of elements of the chart corresponding to the evaluating parameters. Therefore, it is possible to indicate the balance of each skillful grade of the game into which is classified by the evaluating parameters.

(w) The game apparatus is operated to disappear the display of the object which satisfy a predetermined condition, when a plurality of the objects which are arranged in series lengthways or slantwise and adjacent to each other by an instruction given by an operator so as to satisfy a predetermined condition. In the game apparatus, the number of columns on which the objects can be arranged in the storing are more than seven. This results in the fact that the links can be easily caused in comparison with those in the conventional game in which the number of columns is six or less. Furthermore, the degree of difficulty can be reduced. Moreover, the number of displays of the objects which are colorfully drawn in general is increased, thereby making the game more attractive.

(x) The game apparatus is operated to disappear the display of the objects which are arranged when a plurality of the objects having the same color which are arranged in series lengthways or slantwise and adjacent to each other by an instruction given by an operator. In the game apparatus, the number of columns on which the objects can be arranged in the storing are more than seven. This results in the fact that the links can be easily caused in comparison with those in the conventional game in which the number of columns is six or less. Furthermore, the degree of difficulty can be reduced. Moreover, the number of displays of the objects which are colorfully drawn in general is increased, thereby making the game more attractive.

(y) The number of columns on which the objects can be arranged in the storing area is an odd number. For example, the start point from which the block starts falling can be determined at just a center of the display area. Therefore, the player can control the block to be moved in evenly sideways. Moreover, the game becomes over at the time that the objects are piled up to the top of the row in the column. In this game, the object is appeared from the center of the window, so that it is easy for the operator to observe the column or to control the object.

What is claimed is:

1. A game system having at least one display having a display screen, an input controller, and a device executing a game program, said device comprising:

a controller for displaying the progress of a game as a real time image on a first window of said display screen, in response to information input through said input controller;

storage means for storing data for replaying a predetermined scene of said real time image, as data related to a replay image;

judging means for judging whether a game situation during the progress of said game satisfying a predetermined condition for achieving a replay has occurred; and a replay controller for displaying said replay image on a second display window that appears on said display screen, in accordance with the judgment result of said judging means; said replay image being not coextensive with said real time image;

wherein a part of or the entire said real time image and said replay image are simultaneously displayed.

2. A game system according to claim 1, wherein said second display window overlaps with a part of said first display window.

3. A game system according to claim 1, wherein said second display window appears on an area of said display screen that does not overlap with said first display window.

4. A game system according to claim 1, wherein said storage means stores said data related to a replay image and information relevant to said replay image in correspondence with each other.

5. A game system according to claim 1, wherein said game situation satisfying said predetermined condition for achieving a replay, includes a case where an action, which exceeds a predetermined level in relation to a game that is represented by said real time image, is executed.

6. A game system according to claim 1, wherein said situation satisfying said predetermined condition for achieving a replay includes a case where a predetermined instruction is input through said input means.

7. A game system according to claim 1, further comprising means for producing a sound to be output in a synchronized manner with said replay image displayed on said display.

8. A game system according to claim 1, wherein said replay image is displayed in a status that is different to that of said real time image in terms of at least one of the replay speed or direction, or viewpoint angle.

9. A game display method, comprising the steps of:

displaying the progress of a game as a real time image in a first window on the display screen of a display in response to information input through an input controller;

storing data for replaying a predetermined scene of said real time image, as data related to a replay image;

judging whether a game situation during the progress of said game satisfying a predetermined condition for achieving a replay has occurred; and displaying said replay image on a second display window that appears on said display screen, in accordance with said judgment result, said replay image being not coextensive with said real time image;

wherein a part of or the entire said real time image and said replay image window are displayed simultaneously.

10. A game display method according to claim 9, wherein said replay second display window overlaps with part of the whole of said first display window.

11. A game display method according to claim 9, wherein said second display window does not overlap with said first display window.

12. A game display method according to claim 9, wherein said displaying step displays information that is relevant to said replay image on said reply display window simultaneously with said reply image.

13. A game display method according to claim 9, wherein said situation satisfying said predetermined game condition for achieving a replay, includes a case where an action, which exceeds a predetermined level in relation to a game represented by said real time image, is executed.

14. A game display method according to claim 9, wherein said situation satisfying said predetermined condition for achieving a replay includes a case that a predetermined instruction is input through said input controller.

15. A game display method according to claim 9, further comprising a step of producing a sound in a synchronized manner with said replay image.

16. A game display method according to claim 9, wherein said replay image is displayed in a status that is different to that of said real time image in terms of at least one of the replay speed or direction, or viewpoint angle.

17. A game system having at least a first device display and a second display device, an input controller, and a device executing a game program, said device comprising:

a controller for displaying the progress of a game as a real time image on said first display device, in response to information input through said input controller;

storage means for storing data for replaying a predetermined scene of said real time image, as data related to a replay image;

judging means for judging whether a game situation during the progress of said game satisfying a predetermined condition for achieving a replay has occurred; and a replay controller for displaying said replay image on a replay display window that appears on said second display device, in accordance with the judgment result of said judging means;

wherein a part of or the entire said real time image and said replay image in said replay display window are simultaneously displayed on two different display devices.

18. A game display method, comprising the steps of:

displaying the progress of a game as a real time image on a first display device in response to information input through an input controller;

storing data for replaying a predetermined scene of said real time image, as data related to a replay image;

judging whether a game situation during the progress of said game satisfying a predetermined condition in the progress of said game for achieving a replay has occurred; and displaying said replay image on a replay display window that appears on a second display device different than said first display device, in accordance with said judgment result;

wherein a part of or the entire said real time image and said replay image in said replay display window are displayed simultaneously on two different display devices.

* * * * *